(12) United States Patent
Jung et al.

(10) Patent No.: US 12,231,370 B2
(45) Date of Patent: Feb. 18, 2025

(54) ARCHITECTURE AND WIRELESS COMMUNICATION PROTOCOL ARCHITECTURE IN WIRELESS COMMUNICATION SYSTEM

(71) Applicant: Samsung Electronics Co., Ltd., Suwon-si (KR)

(72) Inventors: Byounghoon Jung, Suwon-si (KR); Byungju Lee, Suwon-si (KR); Jungsoo Jung, Suwon-si (KR); Donghyun Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 17/765,207

(22) PCT Filed: Sep. 9, 2020

(86) PCT No.: PCT/KR2020/012187
§ 371 (c)(1),
(2) Date: Mar. 30, 2022

(87) PCT Pub. No.: WO2021/066341
PCT Pub. Date: Apr. 8, 2021

(65) Prior Publication Data
US 2022/0393839 A1    Dec. 8, 2022

(30) Foreign Application Priority Data
Sep. 30, 2019 (KR) .......................... 10-2019-0120902

(51) Int. Cl.
*H04L 5/00* (2006.01)
*H04W 8/24* (2009.01)
(Continued)

(52) U.S. Cl.
CPC ............. *H04L 5/0058* (2013.01); *H04W 8/24* (2013.01); *H04W 28/0278* (2013.01); *H04W 72/1273* (2013.01); *H04W 76/10* (2018.02)

(58) Field of Classification Search
CPC ...... H04L 5/0058; H04W 76/10; H04W 8/24; H04W 28/0278; H04W 72/1273
See application file for complete search history.

(56) References Cited

U.S. PATENT DOCUMENTS

2009/0252136 A1    10/2009    Mahany et al.
2012/0208537 A1    8/2012    Edge et al.
(Continued)

FOREIGN PATENT DOCUMENTS

CN    112544091 A  *  3/2021  ........ H04W 36/0011
JP    2018511221 A  *  4/2018
(Continued)

OTHER PUBLICATIONS

CMCC, Use Case of Edge Computing, 3GPP TSG-RAN WG3 #104, R3-192547, Reno, USA, May 13-17, 2019.
(Continued)

*Primary Examiner* — Saad A. Waqas
(74) *Attorney, Agent, or Firm* — Jefferson IP Law, LLP

(57) ABSTRACT

The present disclosure relates to a $5^{th}$ generation (5G) or pre-5G communication system for supporting a higher data rate than that of a $4^{th}$ generation (4G) communication system such as long-term evolution (LTE). A method for operating a device for adaptively changing or selecting a computing structure and wireless communication protocol structure can comprise the steps of: receiving a device capability information request message of the device from a base station; determining a device capability information message indicating the computing capability and protocol capability of the device; transmitting the device capability information message to the base station; and receiving a radio resource control (RRC) message on the basis of the computing structure and protocol structure configured by the base station.

8 Claims, 18 Drawing Sheets

(51) Int. Cl.
    *H04W 28/02*     (2009.01)
    *H04W 72/1273*     (2023.01)
    *H04W 76/10*     (2018.01)

(56) References Cited

U.S. PATENT DOCUMENTS

2018/0249317 A1     8/2018   Kurasugi et al.
2022/0368406 A1*  11/2022  Kang ..................... H04B 7/061

FOREIGN PATENT DOCUMENTS

| WO | 2017/100640 A1 | 6/2017 | | |
|---|---|---|---|---|
| WO | 2017/121478 A1 | 7/2017 | | |
| WO | WO-2019137226 A1 * | 7/2019 | ........... | H04B 7/0626 |

OTHER PUBLICATIONS

Korean Office Action dated Jan. 21, 2024, issued in Korean Patent Application No. 10-2019-0120902.
Korean Notice of Patent Grant dated Sep. 27, 2024, issued in Korean Patent Application No. 10-2019-0120902.

\* cited by examiner

ARCHITECTURE AND WIRELESS COMMUNICATION PROTOCOL ARCHITECTURE IN WIRELESS COMMUNICATION SYSTEM

TECHNICAL FIELD

The disclosure relates generally to a wireless communication system and, more particularly, to a method, a device, and a system for transmitting and selecting protocol and computing information signals in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in higher frequency (mmWave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

An LTE protocol has a layer structure. Most protocol entities perform functions common to a user plane and a control plane. A user plane protocol stack may include a packet data convergence protocol (PDCP) regarding header compression and encryption, radio link control (RLC) regarding SDU transmission service provision or SDU division, medium access control (MAC) regarding logical channel multiplexing, uplink and downlink scheduling, and a physical (PHY) stack regarding multi-antenna configuration. A control plane protocol stack has radio resource control (RRC) and non-access stratum (NAS) domains added to the user plane protocol.

In addition, there has been ongoing development regarding cloud computing such that a terminal does not independently process information, and another terminal connected through the Internet processes information. In connection with a structure for implementing such cloud computing, a virtual machine structure which implements a physical computing environment on a software basis and a container structure which isolates applications and driving environments from operating systems and hardware, are used.

In connection with a computing implementation structure using wireless communication, mobile edge computing is used, which is a technology for combining wireless communication and cloud computing, or positioning a server near a user supposed to use a communication service, thereby processing the user's data. In this case, communication functions as a passage of information transfer, and application-based computing is performed.

DISCLOSURE OF INVENTION

Technical Problem

Based on the above discussion, the disclosure relates to a communication technology for new computing environments and structures.

In addition, the disclosure provides a device, a system, and a method for changing or selecting a computing structure and a wireless communication protocol structure adaptively in a wireless communication system.

In addition, the disclosure relates to a next-generation wireless communication system, and relates to a method for selecting computing and protocols in order to transmit/receive data in a system including a base station and a terminal.

In addition, the disclosure provides a device, a system, and a method for transmitting/receiving signals which exchange information regarding computing and protocols for data transmission/reception.

In addition, the disclosure provides a device, a system, and a method for changing computing and protocol structures by including and transmitting/receiving terminal capability information, resource allocation information, or information regarding computing and protocol related capabilities inside a radio resource control (RRC) signal for network access by a terminal.

Solution to Problem

According to various embodiments of the disclosure, a method for operating a terminal in a wireless communication system may include receiving a UE capability information request message of the terminal from a base station, determining a UE capability information message indicating a computing capability and a protocol capability of the terminal, transmitting the UE capability information message to the base station, and receiving a RRC message based on a computing structure and a protocol structure, which are configured by the base station.

According to various embodiments of the disclosure, a method for operating a terminal in a wireless communication system may include determining a buffer status report medium access control-control element (BSR MAC-CE) based on the computing capability and protocol capability of the terminal, transmitting the BSR MAC-CE to a base station, and receiving a physical downlink control channel (PDCCH) signal based on the computing structure and protocol structure configured by the base station.

According to various embodiments of the disclosure, a method for operating a terminal in a wireless communication system may include transmitting an RRC connection request message including the computing capability and protocol capability of the terminal to a base station, receiving an RRC connection message including a computing structure and a protocol structure, which are determined by the base station to provide support to the terminal, and configuring a computing structure and a protocol structure based on the RRC connection message.

According to various embodiments of the disclosure, a terminal in a wireless communication system may include a transceiver and at least one processor functionally coupled to the transceiver, wherein the at least one processor may receive a UE capability information request message of the terminal from a base station, may determine a UE capability information message indicating the computing capability and protocol capability of the terminal, may transmit the UE capability information message to the base station, and may perform control to receive a radio resource control (RRC) message based on the computing structure and protocol structure configured by the base station.

According to various embodiments of the disclosure, a terminal in a wireless communication system may include a transceiver and at least one processor functionally coupled to the transceiver, wherein the at least one processor may determine a buffer status report medium access control-control element (BSR MAC-CE) based on the computing capability and protocol capability of the terminal, may transmit the BSR MAC-CE to the base station, and may perform control to receive a physical downlink control channel (PDCCH) signal based on the computing structure and protocol structure, which are configured by the base station.

According to various embodiments of the disclosure, a terminal in a wireless communication system may include a transceiver and at least one processor functionally coupled to the transceiver, wherein the at least one processor may transmit an RRC connection request message including the computing capability and protocol capability of the terminal to the base station, may receive an RRC connection message including a computing structure and a protocol structure, which are determined by the base station to provide support to the terminal, and may perform control to configure the computing structure and protocol structure based on the RRC connection message.

According to various embodiments of the disclosure, a method for operating a base station in a wireless communication system may include transmitting a UE capability information request message of a terminal to the terminal, receiving a UE capability information message indicating the computing capability and protocol capability of the terminal, identifying a computing structure and a protocol structure which are supportable to the terminal, and transmitting a radio resource control (RRC) message based on the computing structure and protocol structure which are supportable to the terminal.

According to various embodiments of the disclosure, a method for operating a base station in a wireless communication system may include receiving a buffer status report medium access control-control element (BSR MAC-CE) based on the computing capability and protocol capability of a terminal, determining a computing structure and a protocol structure, which are supportable to the terminal, based on the BSR MAC-CE, transmitting a physical downlink control channel (PDCCH) signal to the terminal based on the determined computing structure and protocol structure, which are supportable to the terminal, and allocating physical downlink control channel (PDCCH) and physical uplink shared channel (PUSCH) resources.

According to various embodiments of the disclosure, a method for operating a base station in a wireless communication system may include receiving a radio resource control (RRC) connection request message including the computing capability and protocol capability of a terminal, determining a computing structure and a protocol structure, which are supportable to the terminal, and transmitting an RRC connection message based on the determined computing structure and protocol structure, which are supportable to the terminal.

According to various embodiments of the disclosure, a base station in a wireless communication system may include a transceiver and at least one processor functionally connected to the transceiver, wherein the at least one processor may transmit a UE capability information request message of a terminal to the terminal, may receive a UE capability information message indicating the computing capability and protocol capability of the terminal, may identify a computing structure and a protocol structure which are supportable to the terminal, and may perform control to transmit a radio resource control (RRC) message based on the computing structure and protocol structure, which are supportable to the terminal.

According to various embodiments of the disclosure, a base station in a wireless communication system may include a transceiver and at least one processor functionally connected to the transceiver, wherein the at least one processor may receive a buffer status report medium access control-control element (BSR MAC-CE) based on the computing capability and protocol capability of a terminal, may determine a computing structure and a protocol structure, which are supportable to the terminal, based on the BSR MAC-CE, may transmit a physical downlink control channel (PDCCH) signal to the terminal based on the determined computing structure and protocol structure which are supportable to the terminal, and may control to allocate physical downlink shared channel (PDSCH) and physical uplink shared channel (PUSCH) resources.

According to various embodiments of the disclosure, a base station in a wireless communication system may include a transceiver and at least one processor functionally connected to the transceiver, wherein the at least one processor may receive a radio resource control (RRC) connection request message including the computing capability and protocol capability of a terminal, may determine a computing structure and a protocol structure, which are supportable to the terminal, and may perform control to transmit the RRC connection message based on the determined computing structure and protocol structure, which are supportable to the terminal.

Advantageous Effects of Invention

A device and a method according to various embodiments of the disclosure may adaptively determine a computing structure and a wireless communication protocol structure related thereto.

Advantageous effects obtainable from the disclosure may not be limited to the above-mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for allocating an uplink control channel to a terminal in a wireless communication system. Specifically, the disclosure describes a technique for multiplexing channels by allocating the same resource to uplink control channels having different formats in a wireless communication system.

As used in the following description, terms referring to signals, terms referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

Further, various embodiments of the disclosure will be described using terms used in some communication standards (e.g., 3rd generation partnership project (3GPP)), but they are for illustrative purposes only. Various embodiments of the disclosure may also be easily modified and applied to other communication systems.

Figure 1:
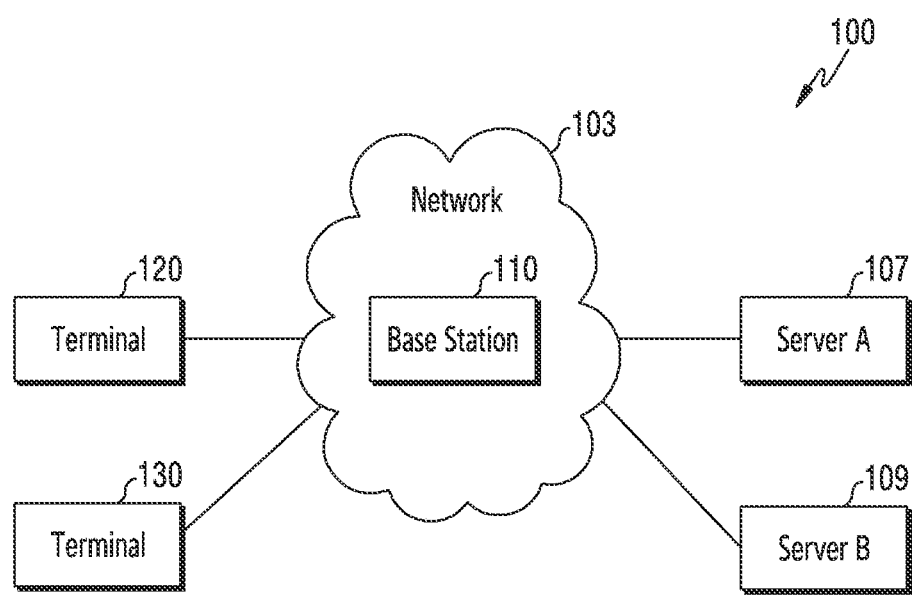
FIG. 1 illustrates a network system in a wireless communication system according to various embodiments of the disclosure.

FIG. 1 illustrates a network system 100 in a wireless communication system according to various embodiments of the disclosure. FIG. 1 illustrates a base station 110, a terminal 120, and a terminal 130, as a part of nodes which use a wireless channel in a wireless communication system. FIG. 1 illustrates only one base station, but other base stations identical or similar to the base station 110 may be further included. The network system in a wireless communication system may include a network 103 including the terminal 120 and the base station 110 and at least one server (server A 107 and server B 109 as shown) connected thereto. The base station 110 is a network infrastructure for providing wireless access to the terminals 120 and 130. The base station 110 includes a coverage which is defined as a predetermined geographic area based on a distance in which signal transmission is possible. The base station 110 may be referred to as, in addition to a base station, an "access point (AP)", an "eNodeB (eNB)", a "5th generation node (5G node)", a "next generation node B (gNB)", a "wireless point", a "transmission/reception point (TRP)" or other terms having an equivalent technical meaning thereof.

Each of the terminal 120 and the terminal 130 is a device used by a user, and performs communication with the base station 110 through a wireless channel In some cases, at least one of the terminal 120 and the terminal 130 may be operated without user involvement. That is, at least one of the terminal 120 and the terminal 130 is a device for performing machine type communication (MTC), and may not be carried by a user. Each of the terminal 120 and the terminal 130 may be referred to as, in addition to a terminal, a "user equipment (UE)", a "mobile station", a "subscriber station", or a "remote terminal", a "wireless terminal", a "user device", or other terms having an equivalent technical meaning thereof.

The base station 110, the terminal 120, and the terminal 130 may transmit or receive a radio signal in a mmWave band (e.g., 28 GHz, 30 GHz, 38 GHz, and 60 GHz). Here, in order to improve a channel gain, the base station 110, the terminal 120, and the terminal 130 may perform beamforming. Here, beamforming may include transmission beamforming and reception beamforming. That is, the base station 110, the terminal 120, and the terminal 130 may give directivity to a transmission signal or a reception signal. To this end, the base station 110 and the terminals 120 and 130 may select serving beams through a beam search or beam management procedure. After the serving beams are selected, the subsequent communication is performed through a resource which is in a quasi-co-located (QCL) relationship with a resource having transmitted the serving beams.

A first antenna port and a second antenna port may be said to be in a QCL relationship if the large-scale characteristics of the channel over which a symbol on the first antenna port is transferred can be inferred from the channel over which a symbol on the second antenna port is transferred. For example, the large-scale characteristics of the channel may include at least one of delay spread, Doppler spread, Doppler shift, average gain, and average delay, and spatial receiver parameter.

Figure 2:
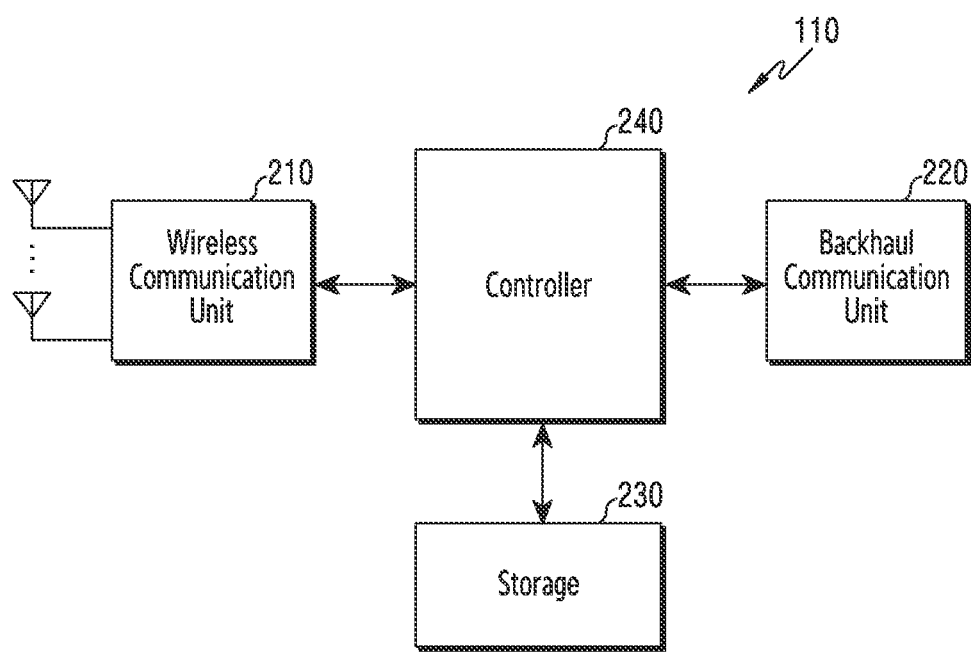
FIG. 2 illustrates a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term "unit" or terms ending with suffixes "-er" and "-or" used in the following description refer to a unit which processes at least one function or operation, and may be implemented by hardware, software, or a combination of hardware and software.

Referring to FIG. 2, the base station 110 includes a wireless communication unit 210, a backhaul communication unit 220, a storage 230, and a controller 240.

The wireless communication unit 210 performs functions for transmitting or receiving signals through a wireless channel. For example, the wireless communication unit 210 performs a conversion function between a baseband signal and a bit string according to a physical layer standard of a system. For example, at the time of data transmission, the wireless communication unit 210 generates complex symbols by encoding and modulating a transmission bit string. In addition, at the time of data reception, the wireless communication unit 210 reconstructs a reception bit string by demodulating and decoding the baseband signal.

In addition, the wireless communication unit 210 up-converts a baseband signal into a radio frequency (RF) band signal and then transmits the signal through an antenna, and down-converts an RF band signal received through the antenna into a baseband signal. To this end, the wireless communication unit 210 may include a transmission filter, a reception filter, an amplifier, a mixer, an oscillator, a digital to analog convertor (DAC), an analog to digital converter (ADC), and the like. Further, the wireless communication unit 210 may include a plurality of transmission/reception paths. Furthermore, the wireless communication unit 210 may include at least one antenna array configured by a plurality of antenna elements.

In the hardware aspect, the wireless communication unit 210 may include a digital unit and an analog unit, and the analog unit may include a plurality of sub-units according to operating power, operating frequency, and the like. The digital unit may be implemented by at least one processor (e.g., a digital signal processor (DSP)).

The wireless communication unit 210 transmits or receives signals as described above. Accordingly, all or part of the wireless communication unit 210 may be referred to as a "transmitter", a "receiver", a "transmitter/receiver", or a "transceiver". In addition, in the following description, transmission or reception performed through a wireless channel may include performing the processing described above by the wireless communication unit 210.

The backhaul communication unit 220 provides an interface for performing communication with other nodes in a network. That is, the backhaul communication unit 220 converts a bit string, which is transmitted from the base station 110 to another node, for example, another access node, another base station, an upper node, and a core network, into a physical signal, and converts a physical signal, which is received from another node, into a bit string.

The storage 230 stores data, such as a basic program, an application program, and configuration information regarding the operation of the base station. The storage 230 may include a volatile memory, a nonvolatile memory, or a combination of a volatile memory and a nonvolatile memory. Then, the storage 230 provides the stored data at the request of the controller 240.

The controller 240 controls overall operations of the base station. For example, the controller 240 transmits or receives signals through the wireless communication unit 210 or the backhaul communication unit 220. In addition, the controller 240 records or reads data in or from the storage 230. In addition, the controller 240 may perform functions of a protocol stack required in the communication standard. According to another example of implementation, the protocol stack may be included in the wireless communication unit 210. To this end, the controller 240 may include at least one processor. According to embodiments, the controller 240 may control the base station 110 to perform operations according to embodiments to be described later.

Figure 3:
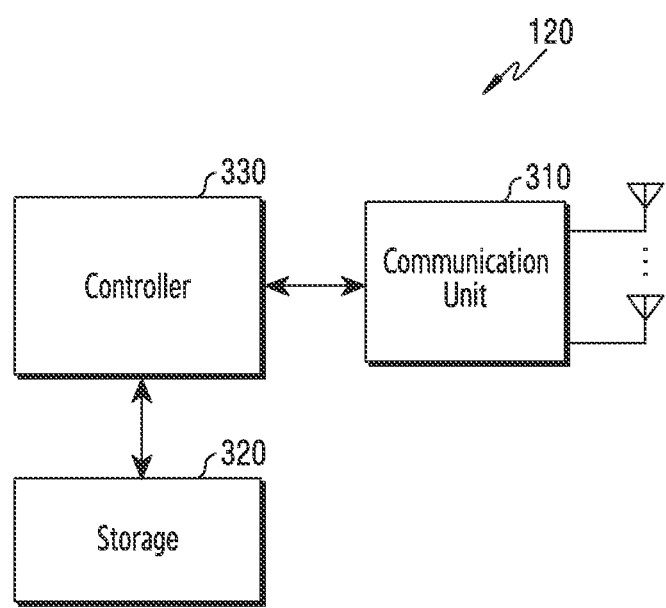
FIG. 3 illustrates a configuration of a terminal in a wireless communication system according to various embodiments of the disclosure.

FIG. 3 illustrates the configuration of a terminal in a wireless communication system according to various embodiments of the disclosure. The configuration illustrated in FIG. 3 may be understood as the configuration of the terminal 120. The term "unit" or terms ending with suffixes "-er" and "-or" used hereinafter refer to a unit which processes at least one function or operation, and may be implemented by hardware, software, or a combination of hardware and software.

Referring to FIG. 3, the terminal 120 includes a communication unit 310, a storage 320, and a controller 330.

The communication unit 310 performs functions for transmitting or receiving signals through a wireless channel. For example, the communication unit 310 performs a conversion function between a baseband signal and a bit string according to a physical layer standard of the system. For example, at the time of data transmission, the communication unit 310 generates complex symbols by encoding and modulating a transmission bit string. In addition, at the time of data reception, the communication unit 310 reconstructs the received bit string by demodulating and decoding the baseband signal. In addition, the communication unit 310 up-converts a baseband signal into an RF band signal and transmits the signal through an antenna, and down-converts an RF band signal received through the antenna into a baseband signal. For example, the communication unit 310 may include a transmission filter, a reception filter, an amplifier, a mixer, an oscillator, a DAC, and an ADC.

In addition, the communication unit 310 may include a plurality of transmission/reception paths. Furthermore, the communication unit 310 may include at least one antenna array including a plurality of antenna elements. In the hardware aspect, the communication unit 310 may include a digital circuit and an analog circuit (e.g., a radio frequency integrated circuit (RFIC)). Here, the digital circuit and the analog circuit may be implemented in one package. In addition, the communication unit 310 may include a plurality of RF chains. Furthermore, the communication unit 310 may perform beamforming.

The communication unit 310 transmits or receives signals as described above. Accordingly, all or a part of the communication unit 310 may be referred to as a "transmitter", a "receiver", or a "transceiver". In addition, in the following description, transmission or reception performed through a wireless channel may include performing processing which is performed by the communication unit 310 as described above.

The storage 320 stores data, such as a basic program, an application program, and configuration information regarding the operation of the terminal 120. The storage 320 may include a volatile memory, a nonvolatile memory, or a combination of a volatile memory and a nonvolatile memory. Then, the storage 320 provides the stored data at the request of the controller 330.

The controller 330 controls overall operations of the terminal 120. For example, the controller 330 transmits or receives signals through the communication unit 310. In addition, the controller 330 records or reads data in or from the storage 320. In addition, the controller 330 may perform functions of a protocol stack required by the communication standard. To this end, the controller 330 may include at least one processor or microprocessor, or may be a part of the processor. In addition, a part of the communication unit 310 and the controller 330 may be referred to as a communication processor (CP). According to embodiments, the controller 330 may control the terminal 120 to perform operations according to embodiments to be described later.

Figure 4:
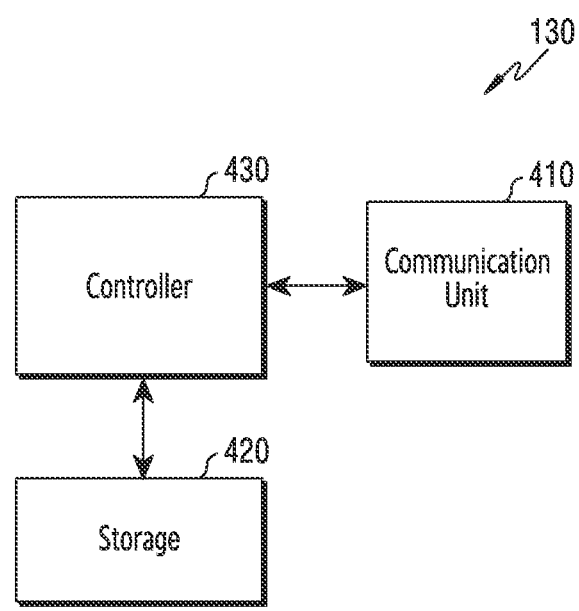
FIG. 4 illustrates a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a detailed configuration of the wireless communication unit 210 of FIG. 2 or the communication unit 310 of FIG. 3. Specifically, FIG. 4 illustrates elements for performing beamforming, as a part of the wireless communication unit 210 of FIG. 2 or as a part of the communication unit 310 of FIG. 3.

Referring to FIG. 4, the wireless communication unit 210 or the communication unit 310 includes an encoding and modulation unit 402, a digital beamformer 404, a plurality of transmission paths 406-1 to 406-N, and an analog beamformer 408.

The encoding and modulation unit 402 performs channel encoding. In order to perform channel encoding, at least one of a low density parity identify (LDPC) code, a convolution code, and a polar code may be used. The encoding and modulation unit 402 generates modulation symbols by performing constellation mapping.

The digital beamformer 404 performs beamforming of a digital signal (e.g., modulation symbols). To this end, the digital beamformer 404 multiplies the modulation symbols by beamforming weights. Here, the beamforming weights are used to change the magnitude and the phase of the signal, and may be referred to as a "precoding matrix", a "precoder", or the like. The digital beamformer 404 outputs the digital-beamformed modulation symbols via the plurality of transmission paths 406-1 to 406-N. Here, according to a multiple-input multiple-output (MIMO) transmission scheme, the modulation symbols may be multiplexed, or the same modulation symbols may be provided via the plurality of transmission paths 406-1 to 406-N.

The plurality of transmission paths 406-1 to 406-N convert the digital-beamformed digital signals into analog signals. To this end, each of the plurality of transmission paths 406-1 to 406-N may include an inverse Fast Fourier transform (IFFT) operation unit, a cyclic prefix (CP) inserter, a DAC, and an up-converter. The CP inserter is for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N provide independent signal processing processes to a plurality of streams generated through digital beamforming. However, some of elements of the plurality of transmission paths 406-1 to 406-N may be used in common according to an implementation method.

The analog beamformer 408 performs beamforming of analog signals. To this end, the digital beamformer 404 multiplies the analog signals by beamforming weights. Here, the beamforming weights are used to change the magnitude and the phase of a signal. Specifically, the analog beamformer 440 may be variously configured according to a connection structure between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one antenna array, or may be connected to two or more antenna arrays.

Figure 5:
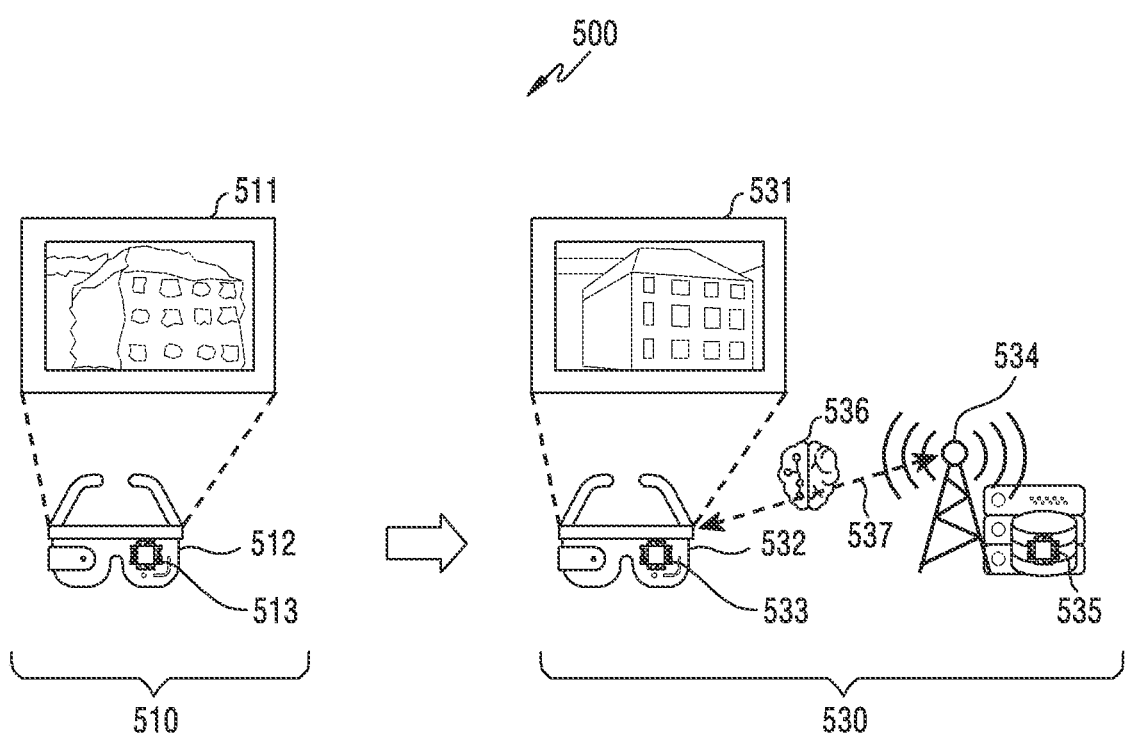
FIG. 5 illustrates an example of performing computing based on 6th-generation (6G) wireless communication and artificial intelligence (AI) in a wireless communication system according to various embodiments of the disclosure.

FIG. 5 illustrates example of performing computing based on 6th-generation (6G) wireless communication and artificial intelligence (AI) in a wireless communication system according to various embodiments of the disclosure.

FIG. 5 illustrates an embodiment 500 for utilizing the performance of hardware connected to a center-side system through communication. The left side 510 of FIG. 5 illustrates an example of driving an independent separate terminal 512. The independent separate terminal 512 may include a central processor 513 for performing computing control, and thus a driving result 511 of the independent separate terminal may be generated. The central processor 513 may perform computing with processing capability based on low power, and thus is driven with low performance. Here, according to an embodiment of the present example, a case in which the CPU is driven with low performance may refer to a case of providing low image quality in a screen display.

The right side 530 of FIG. 5 illustrates an example of driving a split computing terminal 532. The split computing terminal 532 may include a central processor 533 for performing computing control, and thus a driving result 531 of the split computing terminal may be generated. A base station 534 capable of performing computing control may include a central processor 535, and may be connected to the split computing terminal 532 through 6G wireless communication 537. Artificial intelligence technology 536 may be utilized in connection between the base station 534 capable of performing computing control and the split computing terminal 532 through the 6G wireless communication 537.

The central processor 533 included in the split computing terminal may perform computing with processing capability based on low power. The base station 534 capable of performing computing control may have a higher power-based processing capability than the central processor 533 included in the distributed computing terminal. The split computing terminal 532 may be connected to the base station 534 capable of performing computing control through the 6G wireless communication 536 based on the artificial intelligence 536 so as to utilize the processing capability of the base station 534 capable of performing computing control. As a result, the split computing terminal may be driven with high performance through arithmetic processing based on the central processor 535 having faster processing capability than the central processor 533 included therein. According to an embodiment of the present example, a case in which the split computing terminal is driven with high performance may refer to a case of providing high image quality in a screen display.

Figure 6:
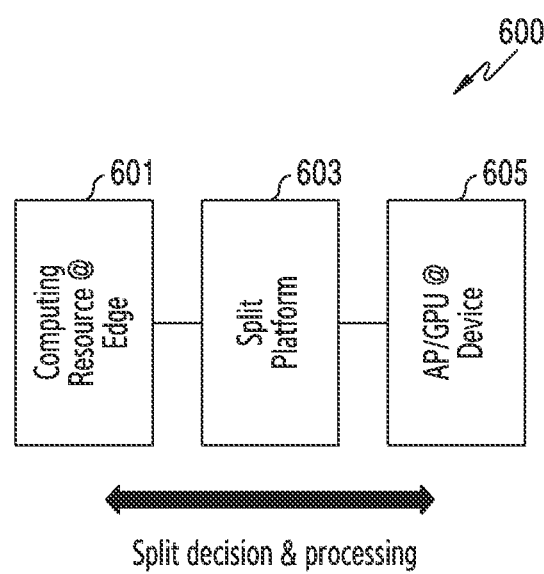
FIG. 6 illustrates an example of a platform for performing distributed computing in a wireless communication system according to various embodiments of the disclosure.

FIG. 6 illustrates an example of a platform for performing split computing in a wireless communication system according to various embodiments of the disclosure.

FIG. 6 illustrates an example of a platform 600 for determining a position for optimal processing for each process in performing computing so as to perform computing in a distributed manner. A split platform 603 may be located between an application processor (AP)/graphic processing unit (GPU) 605 of a terminal and an edge computing resource 601. The split platform 603 may identify the terminal computational complexity of processes based on artificial intelligence. The split platform 603 may determine a position for processing for each process based on the identified terminal computational complexity and the terminal battery capability. In this case, the platform may minimize the modification of an application layer through a hardware virtualization platform of the terminal. According to the split decision determined by the split platform, the process may be performed in a distributed manner.

Figure 7:
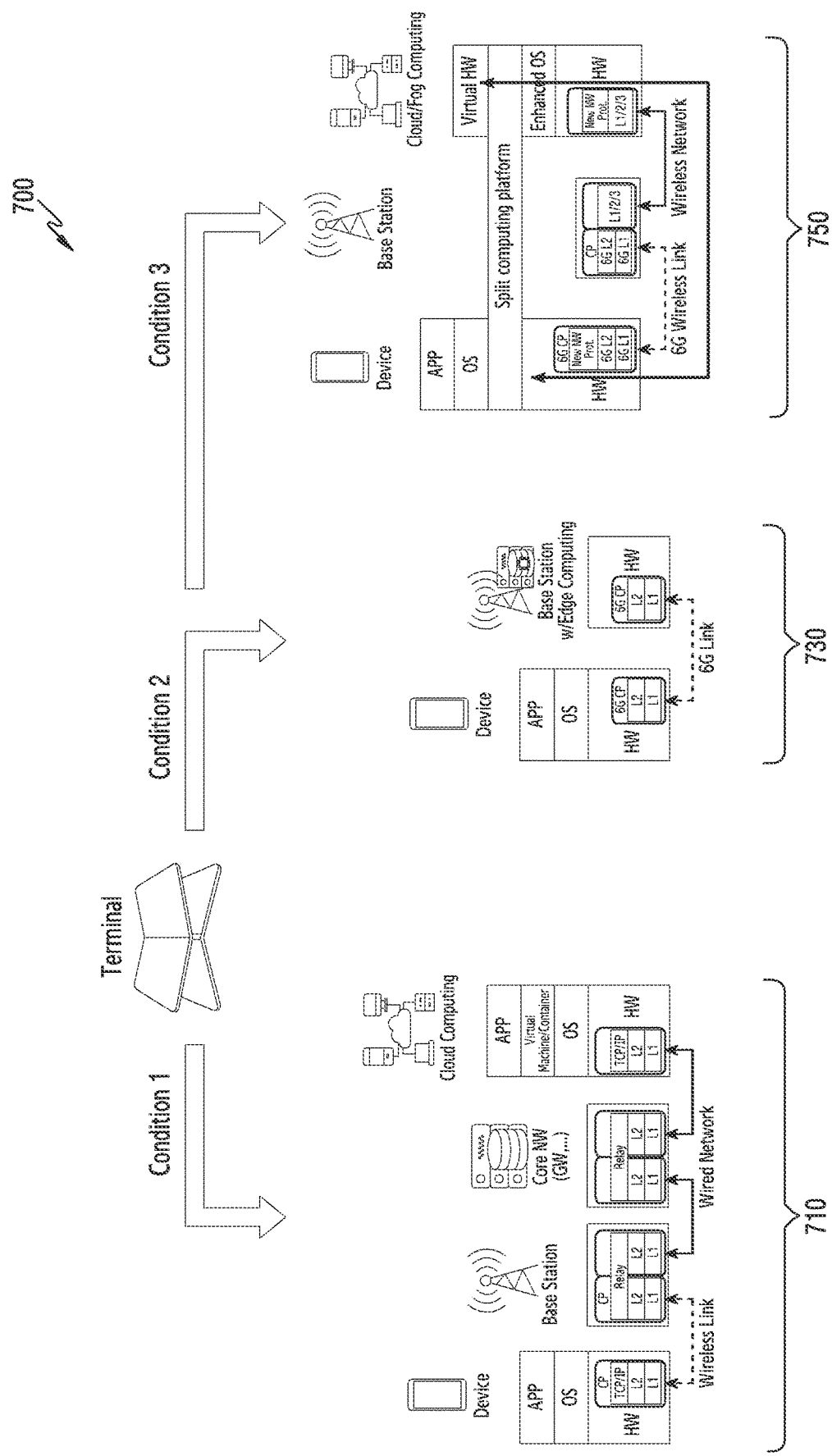
FIG. 7 illustrates an example of a system for adaptively determining a computing structure and an associated wireless communication protocol structure according to a condition in a wireless communication system according to various embodiments of the disclosure.

FIG. 7 illustrates an example of a system for adaptively determining a computing structure and an associated wireless communication protocol structure according to a condition in a wireless communication system according to various embodiments of the disclosure.

FIG. 7 illustrates a computing structure and a protocol structure that are determined according to each condition and illustrates an example of the computing structure and a protocol structure for each condition. A terminal may have different computing structures and protocol structures according to conditions.

According to condition 1, the wireless communication system may have a combination 710 of an existing cloud computing structure and an existing protocol structure. The existing cloud structure uses a cloud within a wired network. Therefore, the base station, which is a wired network, performs cloud computing and communication through a core network, and a wireless network only serves as a link. That is, communication is served as a passage for information transfer, and computing is performed based on applications, and as a result, the existing protocol structure is used. In other words, the protocol structure is not changed.

According to condition 2, the wireless communication system may have a combination 730 of a modified edge computing structure and an Internet protocol (IP)-less protocol structure. Edge computing refers to a method in which data processing is performed in a relatively close position compared to a data center without transferring data generated from terminal devices to a centralized data center. Further, edge computing may also be referred to as fog computing or cloudlets. The edge computing structure modified in the disclosure utilizes an existing terminal-to-terminal connection structure and uses the application and operating system of the terminal. As a result, applications in the modified edge computing may be omitted. Additionally, according to condition 2, the wireless communication system may have an IP-less protocol structure. Only L1 and L2 protocols are used in the hardware protocol, and thus communication is possible through 6G connection.

According to condition 3, the wireless communication system may have a combination 750 of the split computing structure and a reduced network protocol structure. In the split computing structure, a split computing platform may be located between a terminal and cloud computing or between a terminal and edge computing. The platform structure utilizes the existing wired network by utilizing hardware within the wired network. The server may provide virtual hardware on the platform, and the terminal may recognize the platform as hardware. As a result, the wireless communication system may have a reduced network protocol structure.

Figure 8:
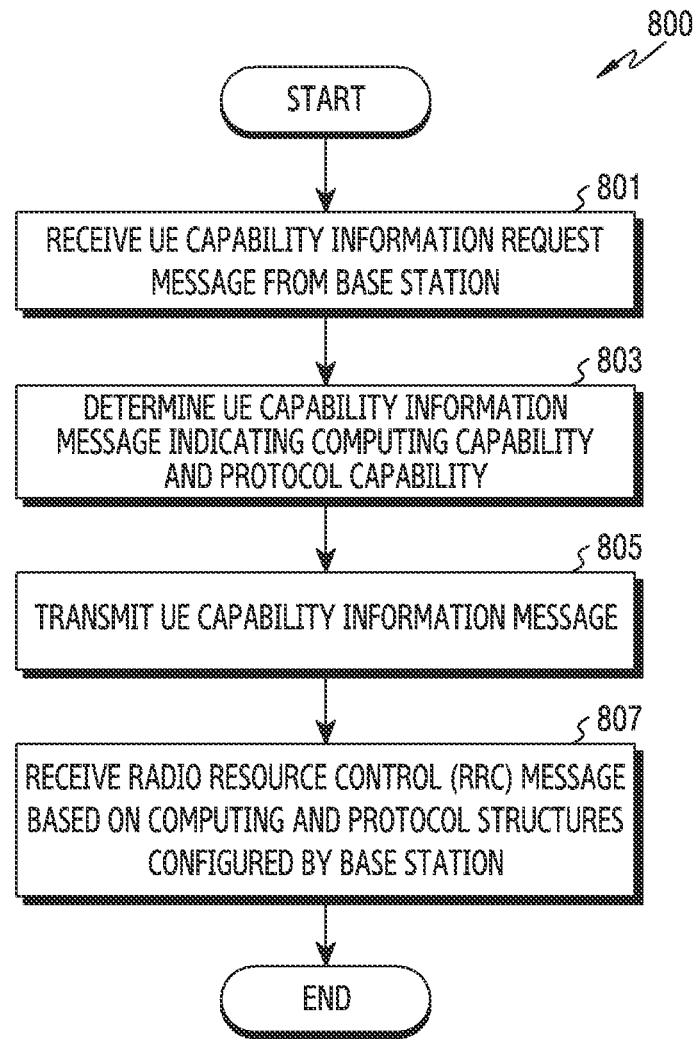
FIG. 8 is a flowchart illustrating an operation method of a terminal, which operates according to computing and protocol structures based on UE capability information in a wireless communication system according to various embodiments of the disclosure.

FIG. 8 is a flowchart 800 illustrating an operation method of a terminal, which operates according to computing and protocol structures based on UE capability information in a wireless communication system according to various embodiments of the disclosure. FIG. 8 illustrates an operation method of the terminal 120.

Referring to FIG. 8, in operation 801, the terminal receives a UE capability information request message from a base station. The UE capability information request message may refer to a message which the base station requests, from the terminal, information indicating computing-related capability and protocol-related capability included in the UE capability information from the UE capability information message.

In operation 803, the terminal determines a UE capability information message indicating computing capability and protocol capability. In order to notify the base station of information about UE capability, the terminal determines a message indicating the computing-related capability and the protocol-related capability of the terminal in the UE capability information message.

In operation 805, the terminal transmits the UE capability information message. In operation 805, the terminal transmits the UE capability information message indicating the computing-related capability and the protocol-related capability of the terminal to a base station.

In operation 807, the terminal receives a radio resource control (RRC) message based on the computing and protocol structures configured by the base station. After receiving the UE capability information message, the base station identifies and determines a computing structure and a protocol structure, which can be supported by the terminal, and the terminal receives the RRC message transmitted according to the determined computing structure and protocol structure. The terminal operates according to the structure configured according thereto.

According to various embodiments of the disclosure, the UE capability information message may include computing-related capabilities. A method including the computing-related capability may be a method using a predefined computing ID. According to an embodiment, the number 1 may be assigned to a modified edge computing ID, the number 2 may be assigned to a cloud computing ID, and the number 3 may be assigned to a split computing ID. According to an embodiment, a method in which the terminal matches each ID to computing, which are included in the UE capability information, may be provided.

According to various embodiments of the disclosure, the UE capability information message may include protocol-related capabilities. A method including the protocol-related capability may be a method using a predefined protocol ID. According to an embodiment, the number 1 may be assigned to a general protocol, the number 2 may be assigned to an IP-less protocol, and the number 3 may be assigned to a service data adaptation protocol (SDAP)-less protocol. According to an embodiment, a method in which the terminal matches each ID to a protocol, which are included in the UE capability information, may be provided.

Figure 9:
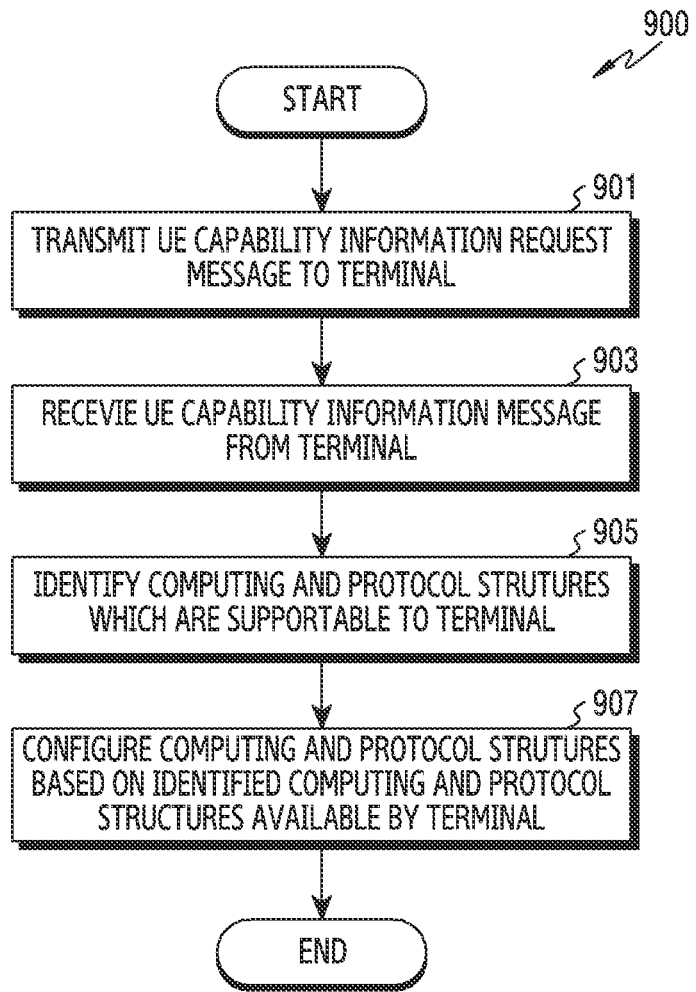
FIG. 9 is a flowchart illustrating an operation method of a base station, which determines computing and protocol structures based on UE capability information in a wireless communication system according to various embodiments of the disclosure.

FIG. 9 is a flowchart 900 illustrating an operation method of a base station, which determines computing and protocol structures based on UE capability information in a wireless communication system according to various embodiments of the disclosure. FIG. 9 illustrates an operation method of the base station 110.

The base station transmits a UE capability information request message to the terminal. The base station requests a UE capability information message in order to determine the UE capability.

Referring to FIG. 9, in operation 901, the base station transmits a UE capability information request message to the terminal. The UE capability information request message may refer to a message for requesting information indicating computing-related capability and protocol-related capability included in the UE capability information from the UE capability information message.

In operation 903, the base station receives a UE capability information message from the terminal. The base station receives a UE capability information message indicating the computing-related capability and protocol-related capability of the terminal, determined in operation 803, from the terminal.

In operation 905, the base station identifies computing and protocol structures, which are supportable to the terminal. The base station determines a computing structure and a protocol structure which are supportable to the terminal based on the UE capability information message, which is received in operation 903.

In operation 907, the base station configures computing and protocol structures based on the identified computing and protocol structures available by the terminal. The base station transmits a radio resource control (RRC) message to the terminal based on the computing structure and protocol structure, which are identified in operation 905, and the terminal operates according to the configuration.

According to various embodiments of the disclosure, the computing-related capability may be included in the UE capability information message. The method including the computing-related capability may be a method using a predefined computing ID. According to an embodiment, the number 1 may be assigned to a modified edge computing ID, the number 2 may be assigned to a cloud computing ID, and the number 3 maybe assigned to a split computing ID. According to an embodiment, a method in which the terminal matches each ID to computing, which are included in the UE capability information, may be provided.

According to various embodiments of the disclosure, the terminal may include the protocol-related capability in the UE capability information message. A method including the protocol-related capability may be a method using a predefined protocol ID. According to an embodiment, the number 1 may be assigned to a general protocol, the number 2 may be assigned to an IP-less protocol, and the number 3 may be assigned to a service data adaptation protocol (SDAP)-less protocol. According to an embodiment, a method in which the terminal matches each ID to a protocol, which are included in the UE capability information, may be provided.

Figure 10:
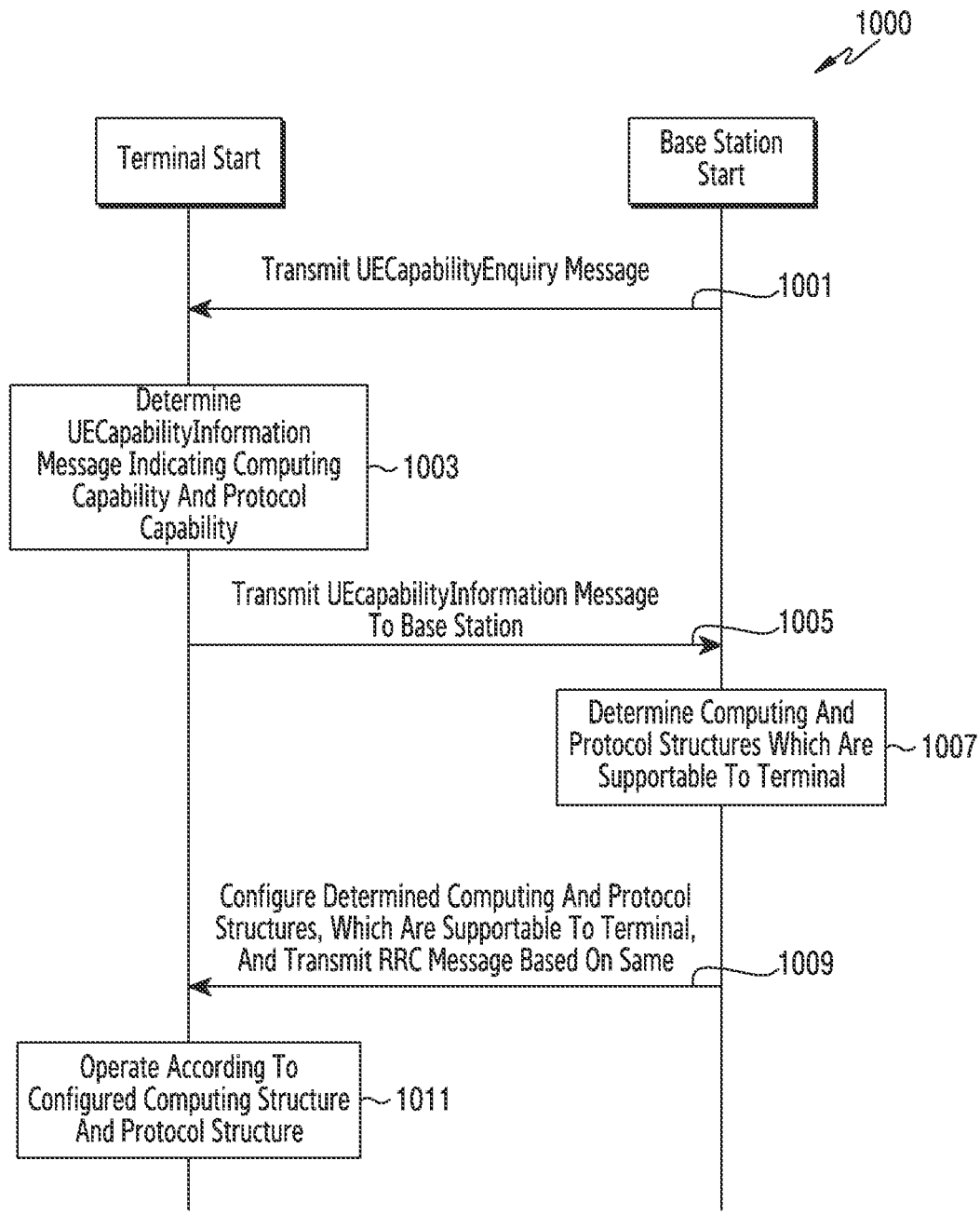
FIG. 10 illustrates a process of determining computing and protocol structures based on UE capability information in a wireless communication system according to various embodiments of the disclosure.

FIG. 10 illustrates a process 1000 of determining computing and protocol structures based on UE capability information in a wireless communication system according to various embodiments of the disclosure.

Referring to FIG. 10, in operation 1001, a base station transmits a UE capability enquiry message to a terminal. In operation 1003, the terminal determines a UE capability information message indicating the computing capability and protocol capability. The terminal determines the UE capability information message including computing and protocol capabilities according to the UE capability enquiry received from the base station. In operation 1005, the terminal transmits the UE capability information message to the base station. Accordingly, in operation 1007, the base station determines computing and protocol structures which are supportable to the terminal. In operation 1009, the base station configures the determined computing and protocol structures available by the terminal, and transmits a radio resource control (RRC) message based thereon. The base station transmits an RRC message to the terminal according to the computing structure and protocol structure, which are determined in operation 1007, and the terminal operates according to the configured computing structure and protocol structure in operation 1011.

According to an embodiment, the terminal may include, in the UE capability information message, information relating to a computing capability that can be supported according to a capability and transmit the same to the base station. The computing capability information may be configured as an ID by using standardized information by a terminal and a base station, and a specific computing capability may be referred to by a specific ID. For example, the terminal and the base station may recognize a combination in which an ID and a computing method are associated, based on standardized information as follows at the time of manufacture through a predefined definition. According to an embodiment, a specific computing capability may be referred to by a specific ID through a predefined definition as shown in <Table 1> below.

TABLE 1

ID 1 - Cloud Computing,
ID 2 - Edge Computing,
ID 3 - Split Computing,
ID 4 - Fog Computing
ID 5 - Computing at BS
. . .

The computing capability information may include only an ID based on information previously exchanged between a terminal and a base station. According to an embodiment, the computing capability information may include an ID based on a combination of an ID and a computing method associated. Further, a specific ID may refer to a specific computing capability. The terminal may transmit a physical (PHY) packet, a medium access control (MAC) packet, or an RRC message including computing capability information to the base station. In addition, the computing capability information may be transmitted while being included in the UE capability information, which is transmitted by the terminal to the base station, as shown in <Table 2> below.

TABLE 2

```
UE-Capability ::=            SEQUENCE {
   accessStratumRelease         AccessStratumRelease,
   pdcp-Parameters              PDCP-Parameters,
   rlc-Parameters               RLC-Parameters              OPTIONAL,
   mac-Parameters               MAC-Parameters              OPTIONAL,
   phy-Parameters               Phy-Parameters,
   rf-Parameters                RF-Parameters,
   ...
   maxsupportedComputings         INTEGER (0..maxComputings))
       OPTIONAL,
supportedComputingsList        BIT  STRING   (SIZE (maxComputings))
OPTIONAL,
   supportedComputings          SEQUENCE (SIZE (1.. maxComputings)) OF
ComputingInfoDetails         OPTIONAL,
   ...
}
ComputingInfoDetails ::=     SEQUENCE {
   ComputingId                  INTEGER (0..maxComputings))
       OPTIONAL,
Computing                    BIT STRING (SIZE (maxComputings))    OPTIONAL,
   radioframeAllocationOffset      INTEGER (0..7),
   subframeAllocation1             CHOICE {
      oneFrame                     BIT STRING (SIZE(6)),
      fourFrames                   BIT STRING (SIZE(24))
   },
   subframeAllocation2             CHOICE {
      oneFrame                     BIT STRING (SIZE(2)),
      fourFrames                   BIT STRING (SIZE(8))
   }                                                         OPTIONAL,
-- Need R[SS-BH1]<!—[ if !supportAnnotations]--> [SS_BH1]
   ...
}
```

Referring to <Table 2>, maxsupportedComputings may be determined to configure the maximum number of computing supported by the terminal. In addition, supportedComputingsList may be determined so that computing supported by the terminal is configurable by indicating a previously configured or shared computing ID by a bit string. This list includes all cases of indicating a list of IDs, and is not limited to an indication by a bit string. In <Table 2>, supportedComputings may configure computing supported by the terminal. Through the corresponding information, the terminal and the base station may map different computing methods to specific IDs.

According to an embodiment, the terminal may include, in the UE capability information message, capability information relating to a protocol type that can be supported according to a capability and transmit the same to the base station. The protocol capability information may include IDs by using standardized information of the terminal and the base station, and a specific protocol capability may be referred to by a specific ID. For example, the terminal and the base station may recognize a combination in which an ID and a computing method are associated, based on information standardized as follows at the time of manufacture through a predefined definition. According to an embodiment, a specific protocol capability may be indicated through a specific ID through a predefined definition as shown in <Table 3> below.

TABLE 3

ID 1 - Full protocol (PHY-MAC-RLC-PDCP-SDAP-RRC-IP-TCP/UDP),
ID 2 - SDAP-less protocol (PHY-MAC-RLC-PDCP-RRC-IP-TCP/UDP),
ID 3 - IP-less protocol (PHY-MAC-RLC-PDCP-SDAP-RRC-TCP/UDP),
ID 4 - SDAP-IP-less protocol (PHY-MAC-RLC-PDCP-RRC-TCP/UDP),
ID 5 - TCP/IP-less protocol (PHY-MAC-RLC-PDCP-SDAP-RRC),
ID 6 - TCP/IP-SDAP-less protocol (PHY-MAC-RLC-PDCP-RRC),
ID 7 - TCP/IP-RRC-less protocol (PHY-MAC-RLC-PDCP-SDAP),
ID 8 - TCP/IP-RRC-SDAP-less protocol (PHY-MAC-RLC-PDCP),
ID 9 - PHY-MAC-RLC-only protocol (PHY-MAC-RLC),
ID 10 - PHY-MAC-only protocol (PHY-MAC)
ID 11 - Reduced TCP/IP protocol (PHY-MAC-RLC-PDCP-RRC-rIP-rTCP), The protocol capability information may include only an ID based on information previously exchanged between a terminal and a base station. According to an embodiment, the protocol capability information may include only an ID based on a combination of an ID and a protocol method associated. Further, a specific ID may also refer to a specific protocol capability. The terminal may transmit a PHY packet, a MAC packet, or an RRC message including protocol capability information to the base station. In addition, the protocol capability information may be transmitted while being included in the UE capability information, which is transmitted by the terminal to the base station, as shown in <Table 4> below.

TABLE 4

```
UE-Capability ::=            SEQUENCE {
   accessStratumRelease         AccessStratumRelease,
   pdcp-Parameters              PDCP-Parameters,
   rlc-Parameters               RLC-Parameters              OPTIONAL,
   mac-Parameters               MAC-Parameters              OPTIONAL,
   phy-Parameters               Phy-Parameters,
   rf-Parameters                RF-Parameters,
   ...
   maxsupportedProtocols         INTEGER (0..maxProtocols))
   OPTIONAL,
```

TABLE 4-continued

```
supportedProtocolsList       BIT STRING (SIZE (maxProtocols))   OPTIONAL,
  supportedProtocols             SEQUENCE  (SIZE  (1..  maxProtocols))  OF
ProtocolInfoDetails          OPTIONAL,
    ...
}
ProtocolInfoDetails ::=      SEQUENCE {
    ProtocolId               INTEGER (0.. maxProtocols))
OPTIONAL,
includedProtocols            BIT STRING (SIZE(8))                OPTIONAL,
Computing                    BIT STRING (SIZE (maxProtocols))    OPTIONAL,
    radioframeAllocationOffset          INTEGER (0..7),
    subframeAllocation1      CHOICE {
       oneFrame              BIT STRING (SIZE(6)),
       fourFrames            BIT STRING (SIZE(24))
    },
    subframeAllocation2         CHOICE {
       oneFrame              BIT STRING (SIZE(2)),
       fourFrames            BIT STRING (SIZE(8))
    }                                                            OPTIONAL,
-- Need R<!--[if !supportAimotations]-->[SS_BH2]
    ...
}
```

Referring to <Table 4>, maxsupportedProtocols may be determined to configure the maximum number of protocols supported by a terminal. In addition, supportedProtocolsList may be determined to configure protocols supported by the terminal by indicating a preconfigured or shared protocol ID by a bit string. This list includes all cases indicating a list of IDs, and is not limited to indication by a bit string. In <Table 4>, supportedProtocols may configure protocols supported by the terminal. Through the corresponding information, the terminal and the base station may map different protocol structures to specific IDs. The includedProtocols in supportedProtocols may be configured by a string of bits, and each bit may be determined to be configured to support a specific protocol. The bits of includedProtocols may refer to protocol layers in a sequence of physical (PHY), medium access control (MAC), radio link control (RLC), packet data convergence protocol (PDCP), service data adaptation protocol (SDAP), radio resource control (RRC), Internet protocol (IP), and transmission control protocol (TCP)/user datagram protocol (UDP). According to an embodiment, when the includedProtocols are determined to be {1,1,1,1,0,1,0,0}, the corresponding protocol ID of the corresponding terminal may be understood as performing communication using only PHY, MAC, RLC PDCP, and RRC by the terminal.

The terminal may include, in the UE capability information message, information relating to a protocol type that can be supported according to a capability and transmit the same to the base station. The protocol capability information may be configured as an ID by using information standardized by a terminal and a base station, and a specific protocol capability may be referred to by a specific ID. For example, the terminal and the base station may recognize a combination in which an ID and a computing method are associated, based on standardized information as follows at the time of manufacture through a predefined definition. According to an embodiment, a specific computing capability may be indicated through a specific ID through a predefined definition as shown in <Table 3> below.

According to an embodiment, the terminal may include information relating to computing and protocol structures, which are supported to the base station, in the UE capability information message and transmit the same to the base station. The terminal may include the supported computing capability information and protocol capability information in the capability information message in the form of a series of ID lists. In addition, the terminal may include and display, in the capability information, simultaneously usable computing information and protocol information. For example, the terminal may combine a computing ID and a protocol ID that may be used at the same time and include the same in the capability information. According to an embodiment, the combined computing ID and protocol ID may be represented as shown in <Table 5>.

TABLE 5

| ID | Computing ID | Protocol ID |
|----|--------------|-------------|
| 1  | 1            | 1           |
| 2  | 1            | 2           |
| 3  | 2            | 1           |
| ... | ...         | ...         |

As shown in Table 5, the capability information of the terminal for transferring the determined computing structure and protocol structure may be included in the UE capability information, which is transmitted to the base station by a terminal, as shown in <Table 6> and transmitted.

TABLE 6

```
UE-Capability ::=            SEQUENCE {
    accessStratumRelease         AccessStratumRelease,
    pdcp-Parameters              PDCP-Parameters,
    rlc-Parameters               RLC-Parameters            OPTIONAL,
    mac-Parameters               MAC-Parameters            OPTIONAL,
    phy-Parameters               Phy-Parameters,
    rf-Parameters                RF-Parameters,
    ...
    maxsupportedComputings       INTEGER (0..maxComputings))
       OPTIONAL,
```

TABLE 6-continued

```
supportedComputingsList       BIT STRING (SIZE (maxComputings))
  OPTIONAL,
  supportedComputings           SEQUENCE (SIZE (1.. maxComputings)) OF
ComputingInfoDetails         OPTIONAL,
  maxsupportedProtocols       INTEGER (0..maxProtocols))
    OPTIONAL,
supportedProtocolsList        BIT STRING (SIZE (maxProtocols))  OPTIONAL,
  supportedProtocols            SEQUENCE (SIZE (1.. maxProtocols)) OF
ProtocolInfoDetails           OPTIONAL,
  ...
}
ProtocolInfoDetails ::=       SEQUENCE {
  ProtocolId                    INTEGER (0.. maxProtocols))
OPTIONAL,
  includedProtocols           BIT STRING (SIZE(8))              OPTIONAL,
  Computing                   BIT STRING (SIZE (maxProtocols))  OPTIONAL,
    radioframeAllocationOffset    INTEGER (0..7),
    subframeAllocation1           CHOICE {
      oneFrame                      BIT STRING (SIZE(6)),
      fourFrames                    BIT STRING (SIZE(24))
    },
    subframeAllocation2           CHOICE {
      oneFrame                      BIT STRING (SIZE(2)),
      fourFrames                    BIT STRING (SIZE(8))
    }
OPTIONAL,  -- Need R<!--[if !supportAnnotations]-->[SS_BH3]
  ...
}
```

Referring to <Table 6>, maxsupportedProtocols may be determined to configure the maximum number of protocols supported by the terminal In addition, supportedProtocolsList may be determined to configure protocols supported by the terminal by indicating a preconfigured or shared protocol ID by a bit string. This list includes all cases of indicating a list of IDs, and is not limited to indication by a bit string. In <Table 6>, supportedProtocols may configure protocols supported by the terminal Through the corresponding information, the terminal and the base station may map different protocol structures to specific IDs. The includedProtocols in supportedProtocols may be configured by a string of bits, and each bit may be determined to be configured to support a specific protocol. The bits of includedProtocols may refer to protocol layers in a sequence of PHY, MAC, RLC, PDCP, SDAP, RRC, IP, and TCP/UDP. According to an embodiment, if the includedProtocols are determined to be {1,1,1, 1,0,1,0,0}, the corresponding protocol ID of the corresponding terminal may be understood as performing communication using only PHY, MAC, RLC PDCP, and RRC by the terminal.

Figure 11A:
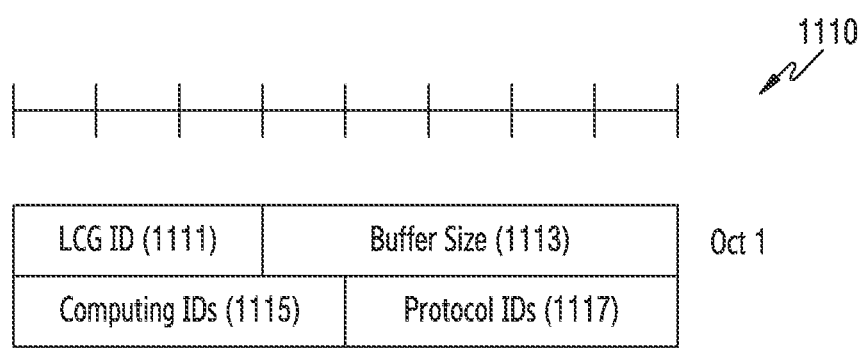
FIG. 11A illustrates a short buffer status report (Short BSR) medium access control-control element (MAC-CE) structure including computing information and protocol information of a terminal.

FIG. 11A illustrates a short buffer status report (short BSR) medium access control-control element (MAC-CE) structure including computing information and protocol information of a terminal. The short BSR may be divided into a normal short BSR and a short-truncated buffer status report (short truncated BSR) according to the completeness of information included in the BSR. A normal short BSR and a short truncated BSR are divided according to the completeness of information, and the BSR may be classified as a normal short BSR when the buffer sizes of all LCGs having data are reported by the corresponding BSR. On the other hand, if LCG having data is not included in the corresponding BSR (i.e., LGC is not reported by the corresponding BSR), the BSR may be classified as a short truncated BSR. The LCG reported by the short truncated BSR may be LCGs having the highest priority among LCGs having data. Referring to FIG. 11A, a short BSR MAC-CE 1100 may include a logical channel group (LCG) ID 1111 and a buffer size 1113. The short BSR MAC-CE structure 1110 is used when there is data to be transmitted in one logical channel group. Here, the logical channel group is obtained by grouping multiple logical channels having quality of service (QoS). In the short BSR MAC-CE structure 1110, in order to indicate a logical channel group corresponding to the buffer size field indicating the buffer size 1113, the logical channel group ID 1111, which is an identifier of a logical channel group, is included therein and transmitted. The Short BSR MAC-CE structure 1110 may include computing IDs 1115 and protocol IDs 1117 of the terminal To this end, computing and protocol mapping may be included in a radio resource control (RRC) signal for configuration of a buffer status report parameter. That is, in order to transmit computing information and protocol information, a MAC-CE used for the purpose of including an uplink MAC PDU may be defined. In this case, the terminal may request activation and deactivation of a specific computing and protocol from the base station.

Figure 11B:
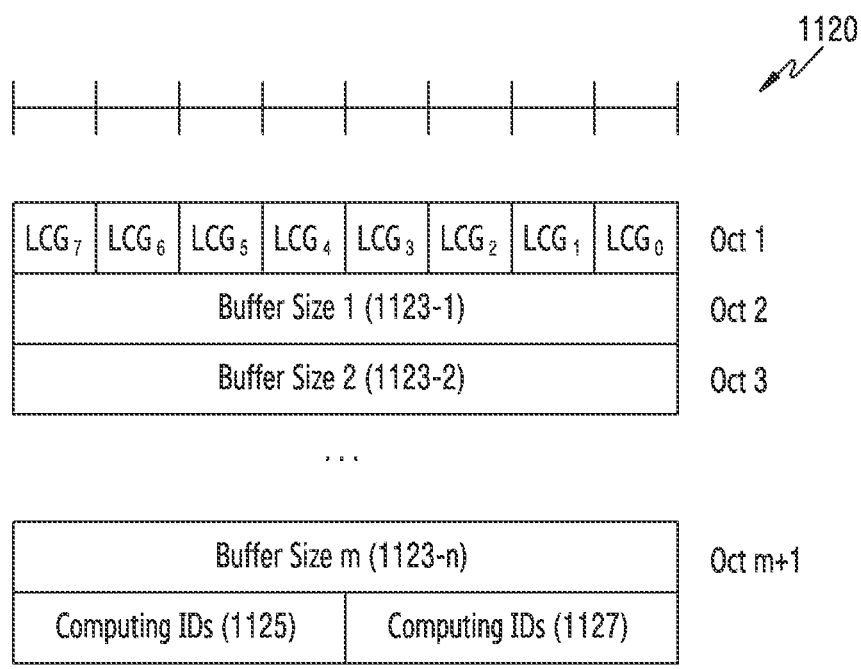
FIG. 11B illustrates a long buffer status report (Long BSR) MAC-CE structure including computing information and protocol information of a terminal.

FIG. 11B illustrates a long buffer status report (Long BSR) MAC-CE structure including computing information and protocol information of a terminal. The long BSR may be divided into a normal long BSR and a long truncated buffer status report (long truncated BSR) according to the completeness of the information included in the BSR. The normal Long BSR and long truncated BSR are divided according to the completeness of information, and the BSR may be classified as a normal long BSR when the buffer sizes of all LCGs having data are reported by the corresponding BSR. On the other hand, if an LCG having data is not included in the corresponding BSR (i.e., LGC is not reported by the corresponding BSR), the BSR may be classified as a long truncated BSR. The LCG reported by the long truncated BSR may be LCGs having the highest priority among LCGs having data. Referring to FIG. 11B, a long BSR MAC-CE structure 1120 is used when there is data to be transmitted in two or more logical channel groups (LCGs). The long BSR MAC-CE structure 1120 includes buffer sizes 1123-1 to 1123-$n$ arranged in ascending order. Logical channel groups may refer to a field indicating the existence of buffer sizes 1123-1 to 1123-$n$ in the format of Long BSR. According to an embodiment, when the logical channel group field is configured to be "1", it is understood as reporting of the buffer size of the logical channel group is performed, and when the logical channel group field is configured to be "0", it indicates that the buffer size of the logical channel group is not reported. The length of the long buffer state size may be determined to be 8 bits, and the buffer size may be 0. The Long BSR MAC-CE structure 1120 may include computing IDs 1125 and protocol IDs 1127 of the terminal. To this end, computing and protocol mapping may be included in the RRC signal for configuration of BSR parameters. That is, in order to transmit computing information and protocol information, a MAC-CE including an uplink MAC PDU may be defined. In this case, the terminal may request activation and deactivation of a specific computing and protocol from the base station.

Figure 12:
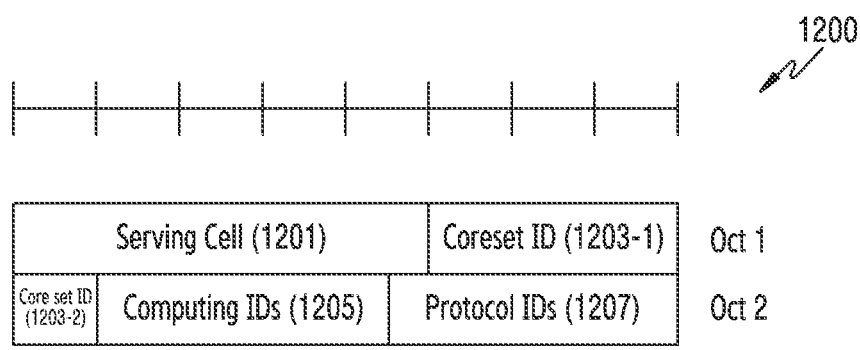
FIG. 12 illustrates a physical downlink control channel (PDCCH) MAC-CE structure for transmission of computing information and protocol information.

FIG. 12 illustrates the structure of a physical downlink control channel (PDCCH) medium access control-control element (MAC-CE) for transmission of computing information and protocol information. Referring to FIG. 12, a PDCCH MAC-CE 1200 may include a serving cell ID 1201 and control resource set (CORESET) IDs 1203-1 to 1203-2. The serving cell ID 1201 may indicate a serving cell to which MAC-CE is applied, and the length of the serving cell ID may be determined to be 5 bits. The CORESET IDs 1203-1 to 1203-2 indicate the state of a transmission configuration indicator (TCI), and the length of the CORESET ID may be determined to be 4 bits. Here, the PDCCH MAC-CE 1200 may have a structure including computing IDs 1205 and protocol IDs 1207. That is, in order to transmit computing information and protocol information, a MAC-CE including a downlink MAC PDU may be defined. According to an embodiment, the base station may configure use of a specific computing and protocol for a specific resource in the terminal.

Figure 13:
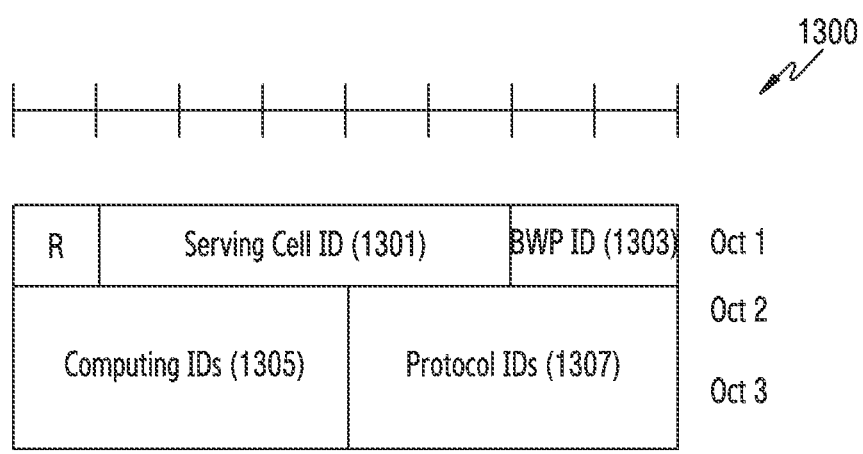
FIG. 13 illustrates a physical downlink shared control channel (PDSCH) MAC-CE structure for transmission of computing information and protocol information.

FIG. 13 illustrates the structure of a physical downlink shared control channel (PDSCH) medium access control-control element (MAC-CE) for transmission of computing information and protocol information. Referring to FIG. 13, a PDSCH MAC-CE 1500 may include a serving cell ID 1301 and a bandwidth part (BWP) ID 1303. The serving cell ID 1301 indicates a serving cell to which MAC-CE is applied, and the length of the serving cell ID may be determined to be 5 bits. The BWP ID 1303 may indicate a downlink bandwidth part, and the length of the BWP ID may be determined to be 2 bits. Here, a PDSCH MAC-CE 1300 may have a structure including computing IDs 1305 and protocol IDs 1307. That is, in order to transmit computing information and protocol information, a MAC-CE including a downlink MAC PDU may be defined. According to an embodiment, the base station may configure activation and deactivation of a specific computing and protocol in the terminal.

Figure 14:
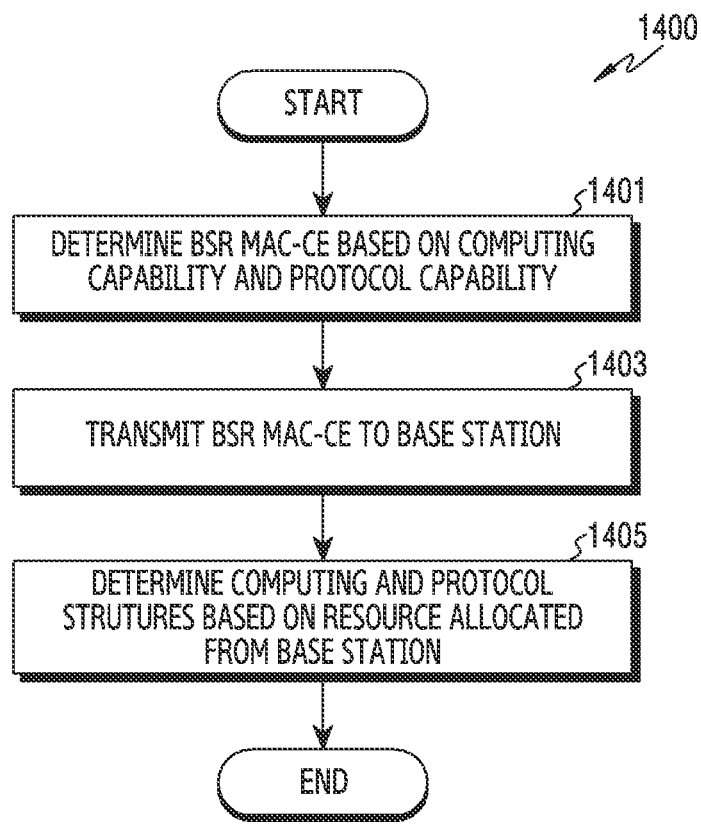
FIG. 14 is a flowchart illustrating an operation method of a terminal, which operates according to computing and protocol structures based on a buffer status report (BSR) MAC-CE in a wireless communication system according to various embodiments of the disclosure.

FIG. 14 is a flowchart 1100 illustrating an operation method of a terminal, which operates according to computing and protocol structures based on a buffer status report (BSR) medium access control-control element (MAC-CE) in a wireless communication system according to various embodiments of the disclosure. FIG. 11 illustrates an operation method of the terminal 120.

Referring to FIG. 14, in operation 1401, the terminal determines a BSR MAC-CE based on a computing capability and a protocol capability. The terminal determines the BSR to include information indicating the computing capability and protocol capability of the terminal in the BSR MAC-CE.

In operation 1403, the terminal transmits the BSR MAC-CE to a base station. The BSR MAC-CE includes information indicating the computing capability and protocol capability of the terminal, and transmits the BSR MAC-CE, which is determined in operation 1401, to the base station.

In operation 1405, the terminal determines the computing and protocol structures based on resources allocated from the base station. The base station determines the computing and the protocol, which are supportable to the terminal, transmits a result of the determination as a physical downlink control channel (PDCCH) signal, and performs allocation of physical downlink shared control channel (PDSCH) and physical uplink shared control channel (PUSCH) resources. According to a result thereof, the terminal determines the computing and protocol structures to perform communication with the base station by using the PDSCH and PUCCH resources configured based on the configured computing and protocol.

Figure 15:
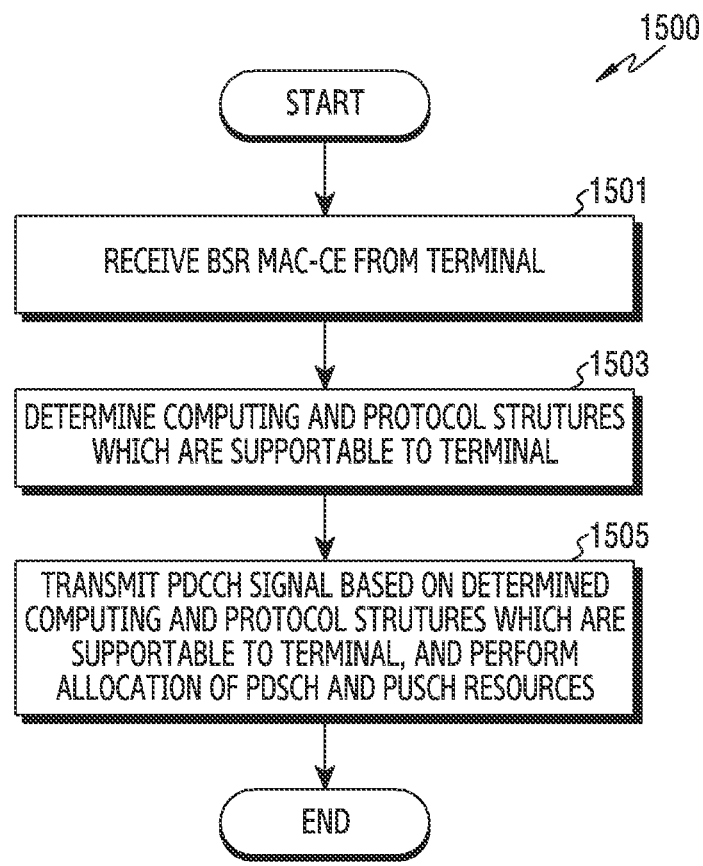
FIG. 15 is a flowchart illustrating an operation method of a base station, which determines computing and protocol structures based on BSR MAC-CE in a wireless communication system according to various embodiments of the disclosure.

FIG. 15 is a flowchart illustrating an operation method of a base station, which determines computing and protocol structures based on a buffer status report (BSR) medium access control-control element (MAC-CE) in a wireless communication system according to various embodiments of the disclosure. FIG. 15 illustrates an operating method of the base station 110.

Referring to FIG. 15, in operation 1501, the base station receives the BSR MAC-CE from a terminal. The BSR MAC-CE received by the base station may include information indicating the computing capability and protocol capability of the terminal.

In operation 1503, the base station determines computing and protocol structures, which are supportable to the terminal. Based on the BSR MAC-CE received from the terminal, the base station determines the computing and protocol structures which are supportable to the terminal.

In operation 1505, the base station transmits a physical downlink control channel (PDCCH) signal based on the determined computing and protocol structures which are supportable to the terminal, and performs allocation of a physical downlink shared control channel (PDSCH) and a physical uplink shared channel (PUSCH) resource. Thereafter, communication is performed using the configured PDSCH and PUSCH resources through the computing and protocol structures configured by the terminal.

Figure 16:
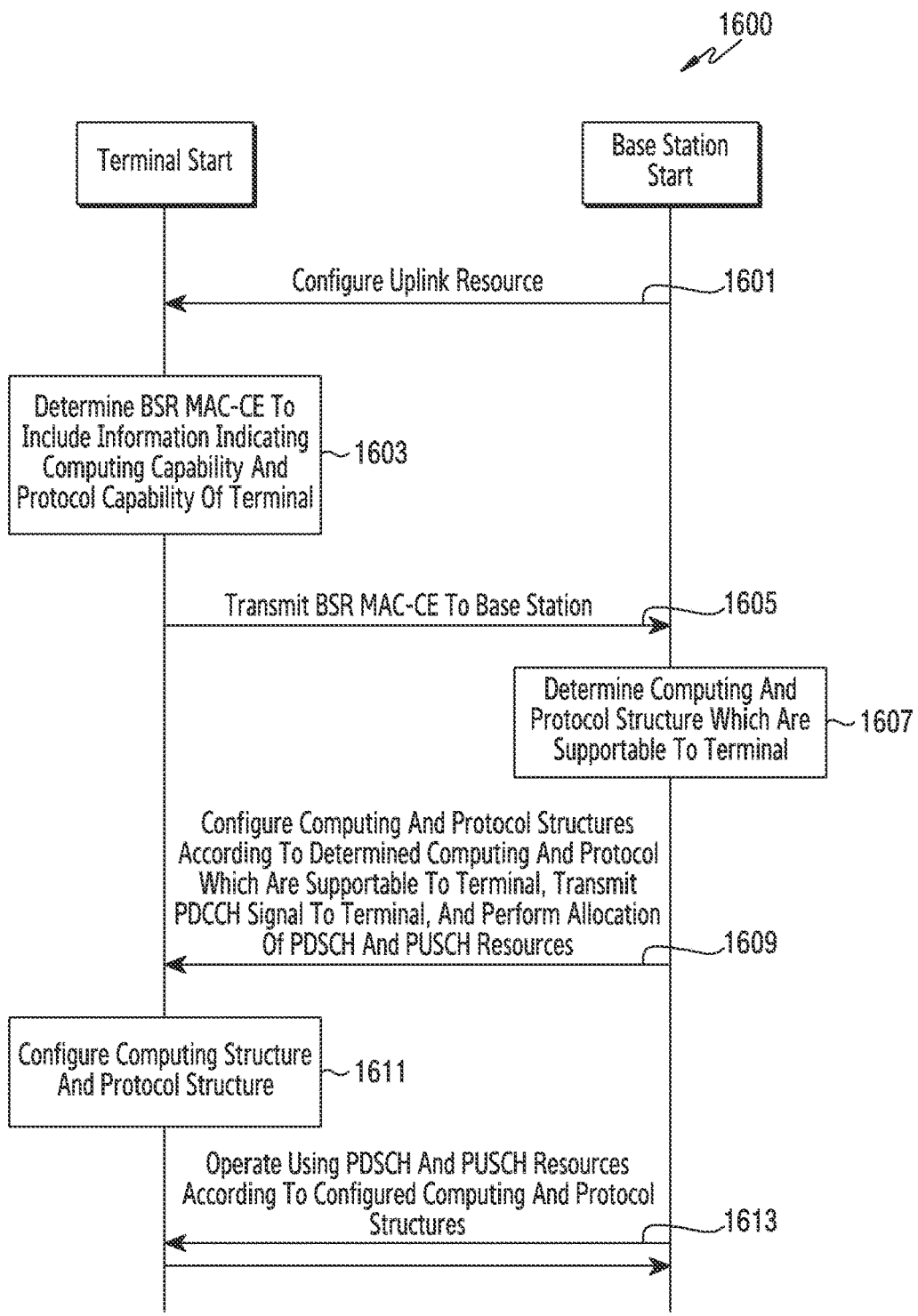
FIG. 16 illustrates a process of determining computing and protocol structures based on BSR MAC-CE in a wireless communication system according to various embodiments of the disclosure.

FIG. 16 illustrates a process of determining computing and protocol structures based on a buffer status report medium access control-control element (BSR MAC-CE) in a wireless communication system according to various embodiments of the disclosure.

Referring to FIG. 16, in operation 1601, the base station configures uplink resources. In operation 1603, the terminal determines the BSR MAC-CE to include information indicating the computing capability and protocol capability of the terminal The BSR MAC-CE may be the BSR MAC-CE structure determined in FIGS. 11A and 11B. In operation 1605, the terminal transmits the BSR MAC-CE to the base station. Accordingly, in operation 1607, the base station determines computing and protocol structures which are supportable to the terminal. In operation 1609, the base station configures computing and protocol structures according to the determined computing and protocol, which are supportable to the terminal, transmits a physical downlink control channel (PDCCH) signal to the terminal, and performs allocation of physical downlink shared control channel (PDSCH) and physical uplink shared channel (PUSCH)) resources. In operation 1611, the terminal configures the computing structure and the protocol structure. In operation 1613, the terminal and the base station operate by using PDSCH and PUSCH resources according to the configured computing and protocol structures.

Figure 17:
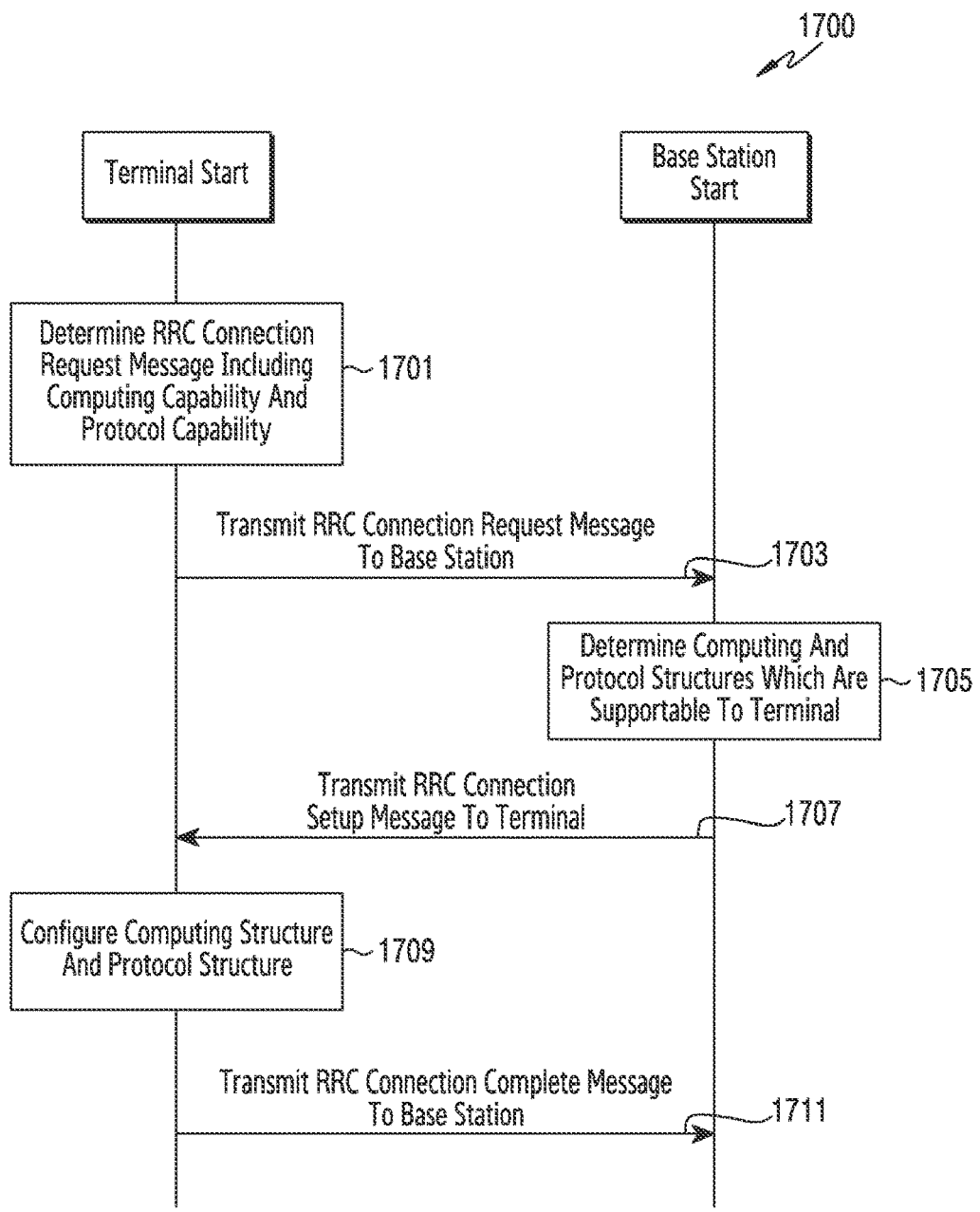
FIG. 17 illustrates a process of accessing a network by inclusion of computing information and protocol information of a terminal in a wireless communication system according to various embodiments of the disclosure.

FIG. 17 illustrates a process of accessing a network by inclusion of computing information and protocol information of a terminal in a wireless communication system according to various embodiments of the disclosure.

Referring to FIG. 17, in operation 1701, the terminal determines a radio resource control (RRC) connection request message including a computing capability and a protocol capability. In operation 1703, the terminal transmits the RRC connection request message to the base station. Accordingly, in operation 1705, the base station determines computing and protocol structures which are supportable to the terminal. In operation 1707, the base station transmits an RRC connection setup message to the terminal. The base station determines the computing and protocol structures according to the determined computing and protocol, which are supportable to the terminal. In operation 1709, the terminal configures the computing structure and the protocol structure. In operation 1711, the terminal transmits an RRC connection complete message to the base station.

According to the disclosure of FIG. 17, a case in which a network is first accessed is illustrated. However, a method for network accessing is not limited to first network accessing, and may include re-accessing a network when a network change occurs.

In addition, computing capability information and protocol capability information may be transmitted while being included in a signal for at least one RRC connection, which is transmitted by a terminal to a base station. The signal for RRC connection may include an RRC connection request, RRC connection resume, and RRC reconfiguration message, but is not limited to the described message.

According to an embodiment, the RRC resume cause for generation of RRC resume may be represented as shown in <Table 7>.

TABLE 7

ResumeCause ::= ENUMERATED {emergency, highPriorityAccess, mt-Access,
    mo-Signalling, mo-Data, mo-VoiceCall, mo-VideoCall,
    mo-SMS, rna-Update, mps-PriorityAccess, mcs-PriorityAccess,
    MEC-Data, N-GPU, N-NPU,
    spare1, spare2, spare3, spare4, spare5{

The previously listed information as RRC resume cause includes emergency, highpriorityAccess, mt-Access, mo-Signaling, mo-Data, mo-VoiceCall, mo-VideoCall, mo-SMS, ma-Update, mps-PriorityAccess, mcs-PriorityAccess. In addition, MEC-Date, N-GPU, and N-NPU may be further included as RRC resume cause factors, and due to these factors, computing information and protocol information in the RRC connection resume may be included therein.

According to an embodiment, an RRC resume request message that is a message for requesting RRC resume may be used, and information included in the RRC resume request message may be represented as shown in <Table 8>.

TABLE 8

| | |
|---|---|
| RRCResumeRequest ::= | SEQUENCE { |
|  rrcResumeRequest | RRCResumeRequest-IEs |
| } | |
| RRCResumeRequest-IEs ::= | SEQUENCE { |
|  resumeIdentity | ShortI-RNTI-Value, |
|  resumeMAC-I | BIT STRING (SIZE (16)), |
|  resumeCause | ResumeCause, |
|  spare | BIT STRING (SIZE (1)) |
|  supportedComputings | INTEGER (0..maxComputings) |
| OPTIONAL,  supportedProtocols | INTEGER |
| (0..maxProtocols))  OPTIONAL | |
| } | |

In <Table 8>, supportedComputings and supportedProtocols may configure computing devices and protocols supported by the terminal. Through the corresponding information, the terminal and the base station may map different computing methods and protocol methods to specific IDs.

Additionally, the information may include computing information and protocol information in an RRC signal associated with network handover of the terminal. According to an embodiment, handshake information exchange for the purpose of terminal handover with a target cell may include computing information and protocol information usable by the terminal and computing information and protocol information which are supportable to the target cell.

In addition, computing information and protocol information which are supportable to the target cell may be included in a handover command. According to an embodiment, the RRC reconfiguration message may include computing information and protocol information. Alternatively, when the terminal accesses the target cell, the configured computing and protocol information may be used. Alternatively, information included in a handover command message used for transmission of a handover command generated by the target base station may be used. The information included in the handover command message may be shown in <Table 9>.

As described above, a method for operating a terminal according to an embodiment of the disclosure may include determining a buffer status report medium access control-control element (BSR MAC-CE) based on the computing capability and protocol capability of the terminal, transmitting the BSR MAC-CE to the base station, and receiving a physical downlink control channel (PDCCH) signal based on the computing structure and protocol structure configured by the base station.

In an embodiment, the BSR MAC-CE may include at least one computing ID or protocol ID.

As described above, a method for operating a terminal according to an embodiment of the disclosure may include transmitting an RRC connection request message including the computing capability and protocol capability of the terminal to the base station, and receiving an RRC connection message including a computing structure and a protocol structure, which are determined by the base station to provide support to the terminal.

In a method according to an embodiment, the RRC connection request message may be one of an RRC connection request message and an RRC connection resume request message.

As described above, a terminal according to an embodiment of the disclosure may include a transceiver and at least

TABLE 9

```
HandoverCommand ::=                     SEQUENCE {
    criticalExtensions                  CHOICE {
        c1                              CHOICE{
            handoverCommand                 HandoverCommand-IEs,
            spare3 NULL, spare2 NULL, spare1 NULL
        },
        criticalExtensionsFuture        SEQUENCE { }
    }
}
HandoverCommand-IEs ::=                 SEQUENCE {
    handoverCommandMessage              OCTET    STRING    (CONTAINING
RCReconfiguration), supportedComputings         INTEGER
(0..maxComputings))                     OPTIONAL, supportedProtocols
    INTEGER (0..maxProtocols))              OPTIONAL,   nonCriticalExtension
SEQUENCE { }                            OPTIONAL
}
```

In <Table 9>, supportedComputings and supportedProtocols may configure computing devices and protocols supported by the terminal. Through the corresponding information, the terminal and the base station may map different computing methods and protocol methods to specific IDs.

As described above, a method for operating a terminal according to an embodiment of the disclosure may include receiving a UE capability information request message of the terminal from a base station, determining a UE capability information message indicating a computing capability and a protocol capability of the terminal, transmitting the UE capability information message to the base station, and receiving a radio resource control (RRC) message based on a computing structure and a protocol structure, which are configured by the base station.

In an embodiment, the UE capability information message may be determined based on a predefined computing ID, and the predefined computing ID may be a combination of an ID and computing associated, based on a predefined standard, by the terminal and the base station.

In an embodiment, the UE capability information message may be determined based on a predefined protocol ID, and the predefined protocol ID may be a combination of an ID and a protocol associated, based on a predefined standard, by the terminal and the base station.

one processor functionally coupled to the transceiver, wherein the at least one processor may receive a UE capability information request message of the terminal from a base station, may determine a UE capability information message indicating the computing capability and protocol capability of the terminal, may transmit the UE capability information message to the base station, and may perform control to receive a radio resource control (RRC) message based on the computing structure and protocol structure configured by the base station.

In an embodiment, the UE capability information message may be determined based on a predefined computing ID, and the predefined computing ID may be a combination of an ID and computing associated, based on a predefined standard, by the terminal and the base station.

In an embodiment, the UE capability information message may be determined based on a predefined protocol ID, and the predefined protocol ID may be a combination of an ID and a protocol associated, based on a predefined standard, by the terminal and the base station.

As described above, a terminal according to an embodiment of the disclosure may include a transceiver and at least one processor functionally coupled to the transceiver, wherein the at least one processor may determine a buffer status report medium access control-control element (BSR MAC-CE) based on the computing capability and protocol capability of the terminal, may transmit the BSR MAC-CE to the base station, and may perform control to receive a physical downlink control channel (PDCCH) signal based on the computing structure and protocol structure, which are configured by the base station.

In an embodiment, the BSR MAC-CE may include at least one computing ID or protocol ID.

As described above, a terminal according to an embodiment of the disclosure may include a transceiver and at least one processor functionally coupled to the transceiver, wherein the at least one processor may transmit an RRC connection request message including the computing capability and protocol capability of the terminal to the base station, may receive an RRC connection message including a computing structure and a protocol structure, which are determined by the base station to provide support to the terminal, and may perform control to configure the computing structure and protocol structure based on the RRC connection message.

In an embodiment, the RRC connection request message is one of an RRC connection request message and an RRC connection resume request message.

As described above, a method for operating a base station according to an embodiment of the disclosure may include transmitting a UE capability information request message of a terminal to the terminal, receiving a UE capability information message indicating the computing capability and protocol capability of the terminal, identifying a computing structure and a protocol structure which are supportable to the terminal, and transmitting a radio resource control (RRC) message based on the computing structure and protocol structure which are supportable to the terminal.

In an embodiment, the UE capability information message may be determined based on a predefined computing ID, and the predefined computing ID may be a combination of an ID and computing associated, based on a predefined standard, by the terminal and the base station.

In an embodiment, the UE capability information message may be determined based on a predefined protocol ID, and the predefined protocol ID may be a combination of an ID and a protocol associated, based on a predefined standard, by the terminal and the base station.

As described above, a method for operating a base station according to an embodiment of the disclosure may include receiving a buffer status report medium access control-control element (BSR MAC-CE) based on the computing capability and protocol capability of the terminal, determining a computing structure and a protocol structure, which are supportable to the terminal, based on the BSR MAC-CE, transmitting a physical downlink control channel (PDCCH) signal to the terminal based on the determined computing structure and protocol structure, which are supportable to the terminal, and performing allocation of physical downlink shared channel (PDSCH) and physical uplink shared channel (PUSCH) resources.

In an embodiment, the BSR MAC-CE may include at least one computing ID or protocol ID.

As described above, a method for operating a base station according to an embodiment of the disclosure may include receiving an RRC connection request message including the computing capability and protocol capability of the terminal, determining a computing structure and a protocol structure, which are supportable to the terminal, and transmitting an RRC connection message based on the determined computing structure and protocol structure, which are supportable to the terminal.

In an embodiment, the RRC connection request message may include one of an RRC connection request message and an RRC connection resume request message.

As described above, a base station according to an embodiment of the disclosure may include a transceiver and at least one processor functionally connected to the transceiver, wherein the at least one processor may transmit a UE capability information request message of a terminal to the terminal, may receive a UE capability information message indicating the computing capability and protocol capability of the terminal, may identify a computing structure and a protocol structure which are supportable to the terminal, and may perform control to transmit a radio resource control (RRC) message based on the computing structure and protocol structure, which are supportable to the terminal.

In an embodiment, the UE capability information message may be determined based on a predefined computing ID, and the predefined computing ID may be a combination of an ID and computing associated, based on a predefined standard, by the terminal and the base station.

In an embodiment, the UE capability information message may be determined based on a predefined protocol ID, and the predefined protocol ID may be a combination of an ID and a protocol associated, based on a predefined standard, by the terminal and the base station.

As described above, a base station according to an embodiment of the disclosure may include a transceiver and at least one processor functionally connected to the transceiver, wherein the at least one processor may receive a buffer status report medium access control-control element (BSR MAC-CE) based on the computing capability and protocol capability of the terminal, may determine a computing structure and a protocol structure, which are supportable to the terminal, based on the BSR MAC-CE, may transmit a physical downlink control channel (PDCCH) signal to the terminal based on the determined computing structure and protocol structure which are supportable to the terminal, and may perform allocation of physical downlink shared channel (PDSCH) and physical uplink shared channel (PUSCH) resources.

In an embodiment, the BSR MAC-CE may include at least one computing ID or protocol ID.

As described above, a base station according to an embodiment of the disclosure may include a transceiver and at least one processor functionally connected to the transceiver, wherein the at least one processor may receive a radio resource control (RRC) connection request message including the computing capability and protocol capability of the terminal, may determine a computing structure and a protocol structure, which are supportable to the terminal, and may perform control to transmit the RRC connection message based on the determined computing structure and protocol structure, which are supportable to the terminal.

In an embodiment, the RRC connection request message may be one of an RRC connection request message and an RRC connection resume request message.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a user equipment (UE) in a wireless communication system, the method comprising:
receiving, from a base station (BS), a UE capability information request message;
determining a UE capability information message indicating a computing capability and a protocol capability of the UE;
transmitting, to the BS, the UE capability information message including a first identifier (ID) indicating a computing structure and a second ID indicating a protocol structure;
receiving a radio resource control (RRC) message based on the computing structure and the protocol structure, which are configured by the BS;
determining a buffer status report medium access control-control element (BSR MAC-CE) based on the computing capability and the protocol capability of the UE;
transmitting the BSR MAC-CE to the BS;
receiving a physical downlink control channel (PDCCH) signal based on the computing structure and the protocol structure, which are configured by the BS; and
determining physical downlink shared channel (PDSCH) and physical uplink shared channel (PUSCH) resources allocated by the BS,
wherein the BSR MAC-CE includes at least one of the first ID and the second ID.

2. The method of claim 1,
wherein the first ID is mapped to the computing structure based on a predefined standard,
wherein the second ID is mapped to the protocol structure based on a predefined standard, and
wherein the UE capability information message includes an ID list in which the first ID is mapped to the second ID.

3. A method performed by a base station (BS) in a wireless communication system, the method comprising:
transmitting, to a user equipment (UE), a UE capability information request message;
receiving, from the UE, a UE capability information message including a first identifier (ID) indicating a computing structure and a second ID indicating a protocol structure;
identifying the computing structure and the protocol structure, which are supportable to the UE;
transmitting, to the UE, a radio resource control (RRC) message based on the computing structure and protocol structure;
receiving, from the UE, a buffer status report medium access control-control element (BSR MAC-CE) based on a computing capability and protocol capability of the UE;
determining the computing structure and the protocol structure, which are supportable to the UE, based on the BSR MAC-CE;
transmitting, to the UE, a physical downlink control channel (PDCCH) signal based on the computing structure and the protocol structure; and
performing allocation of physical downlink shared channel (PDSCH) and physical uplink shared channel (PUSCH) resources,
wherein the BSR MAC-CE includes at least one of the first ID and the second ID.

4. The method of claim 3,
wherein the first ID is mapped to the computing structure based on a predefined standard,
wherein the second ID is mapped to the protocol structure based on a predefined standard, and
wherein the UE capability information message includes an ID list in which the first ID is mapped to the second ID.

5. A user equipment (UE) in a wireless communication system, the UE comprising:
a transceiver; and
a processor coupled with the transceiver and configured to:
receive, from a base station (BS), a UE capability information request message,
determine a UE capability information message indicating a computing capability and a protocol capability of the UE,
transmit, to the BS, the UE capability information message including a first identifier (ID) indicating a computing structure and a second ID indicating a protocol structure,
receive a radio resource control (RRC) message based on the computing structure and the protocol structure, which are configured by the BS, determine a buffer status report medium access control-control element (BSR MAC-CE) based on the computing capability and the protocol capability of the UE,
transmit the BSR MAC-CE to the BS,
receive a physical downlink control channel (PDCCH) signal based on the computing structure and the protocol structure, which are configured by the BS, and
determine physical downlink shared channel (PDSCH) and physical uplink shared channel (PUSCH) resources allocated by the BS,
wherein the BSR MAC-CE includes at least one of the first ID and the second ID.

6. The UE of claim 5,
wherein the first ID is mapped to the computing structure based on a predefined standard,
wherein the second ID is mapped to the protocol structure based on a predefined standard, and
wherein the UE capability information message includes an ID list in which the first ID is mapped to the second ID.

7. A base station (BS) in a wireless communication system, the BS comprising:
a transceiver; and
a processor coupled with the transceiver and configured to:
transmit, to a user equipment (UE), a UE capability information request message,
receive, from the UE, a UE capability information message including a first identifier (ID) indicating a computing structure and a second ID indicating a protocol structure,
identify the computing structure and the protocol structure, which are supportable to the UE,
transmit, to the UE, a radio resource control (RRC) message based on the computing structure and protocol structure,
receive, from the UE, a buffer status report medium access control-control element (BSR MAC-CE) based on a computing capability and protocol capability of the UE,
determine the computing structure and the protocol structure, which are supportable to the UE, based on the BSR MAC-CE,
transmit, to the UE, a physical downlink control channel (PDCCH) signal based on the computing structure and the protocol structure, and
perform allocation of physical downlink shared channel (PDSCH) and physical uplink shared channel (PUSCH) resources,
wherein the BSR MAC-CE includes at least one of the first ID and the second ID.

8. The BS of claim 7,
wherein the first ID is mapped to the computing structure based on a predefined standard,
wherein the second ID is mapped to the protocol structure based on a predefined standard, and
wherein the UE capability information message includes an ID list in which the first ID is mapped to the second ID.

* * * * *

UNITED STATES PATENT AND TRADEMARK OFFICE
CERTIFICATE OF CORRECTION

PATENT NO. : 12,231,370 B2
APPLICATION NO. : 17/765207
DATED : February 18, 2025
INVENTOR(S) : Byounghoon Jung et al.

Page 1 of 1

It is certified that error appears in the above-identified patent and that said Letters Patent is hereby corrected as shown below:

On the Title Page

In item (54), and in the Specification, Column 1, Line 1 please replace the title as follows: "ARCHITECTURE AND WIRELESS COMMUNICATION PROTOCOL ARCHITECTURE IN WIRELESS COMMUNICATION SYSTEM" with --METHOD AND DEVICE FOR DETERMINING COMPUTING ARCHITECTURE AND WIRELESS COMMUNICATION PROTOCOL ARCHITECTURE IN WIRELESS COMMUNICATION SYSTEM--

Signed and Sealed this
Eighteenth Day of March, 2025

Coke Morgan Stewart
*Acting Director of the United States Patent and Trademark Office*